(12) United States Patent
Akutsu et al.

(10) Patent No.: US 6,344,301 B1
(45) Date of Patent: Feb. 5, 2002

(54) METHOD OF FORMING COLORED FILM, DRIVING DEVICE AND LIQUID CRYSTAL DISPLAY DEVICE

(75) Inventors: Eiichi Akutsu; Shigemi Ohtsu; Takao Tomono; Keishi Shimizu, all of Nakai-machi (JP)

(73) Assignee: Fuji Xerox Co., Ltd.

( * ) Notice: Subject to any disclaimer, the term of this patent is extended or adjusted under 35 U.S.C. 154(b) by 17 days.

(21) Appl. No.: 09/612,370

(22) Filed: Jul. 7, 2000

(30) Foreign Application Priority Data

Sep. 7, 1999 (JP) .......................... 11-253227

(51) Int. Cl.[7] .......................... G02F 1/1335; G02B 5/20
(52) U.S. Cl. .......................... 430/7; 349/42; 349/106; 257/59; 257/72
(58) Field of Search .......................... 430/7; 349/42, 349/106; 438/30; 257/59, 72

(56) References Cited

U.S. PATENT DOCUMENTS 6,255,025 B1 * 7/2001 Akutsu et al. .................. 430/7

FOREIGN PATENT DOCUMENTS

| JP | A-63-21622 | 1/1988 |
| JP | A-2-153325 | 6/1990 |
| JP | 5-157905 A * | 6/1993 |
| JP | A-5-257137 | 10/1993 |
| JP | A-10-324994 | 12/1998 |
| JP | A-11-133224 | 5/1999 |
| JP | A-11-350193 | 12/1999 |
| JP | A-2000-28821 | 1/2000 |

* cited by examiner

Primary Examiner—John A. McPherson
(74) Attorney, Agent, or Firm—Oliff & Berridge, PLC

(57) ABSTRACT

A method of forming a colored film includes a step of forming a substrate for electrodeposition by laminating at least a transparent conductive film and a thin transparent photosemiconductor film having a photovoltaic function in this order on the surface of a support having an electronic circuit material thereon, and a step of irradiating with a light at least a thin photosemiconductor film of the substrate for electrodeposition while bringing the same into contact with an aqueous electrolyte containing an electrodeposition material containing a colorant, thereby selectively generating a photoelectromotive force to an irradiated area of the thin photosemiconductor film and electrochemically depositing the electrodeposition material to form a colored electrodeposition film; an electronic driving device containing the colored film and a liquid crystal display device having the electronic driving device, the method capable of forming the colored film of high quality and excellent surface smoothness being formed directly on a substrate having thin film transistor and capable of providing a high quality electronic driving device and a liquid crystal display device at low cost.

18 Claims, 8 Drawing Sheets

PATTERN EXPOSURE

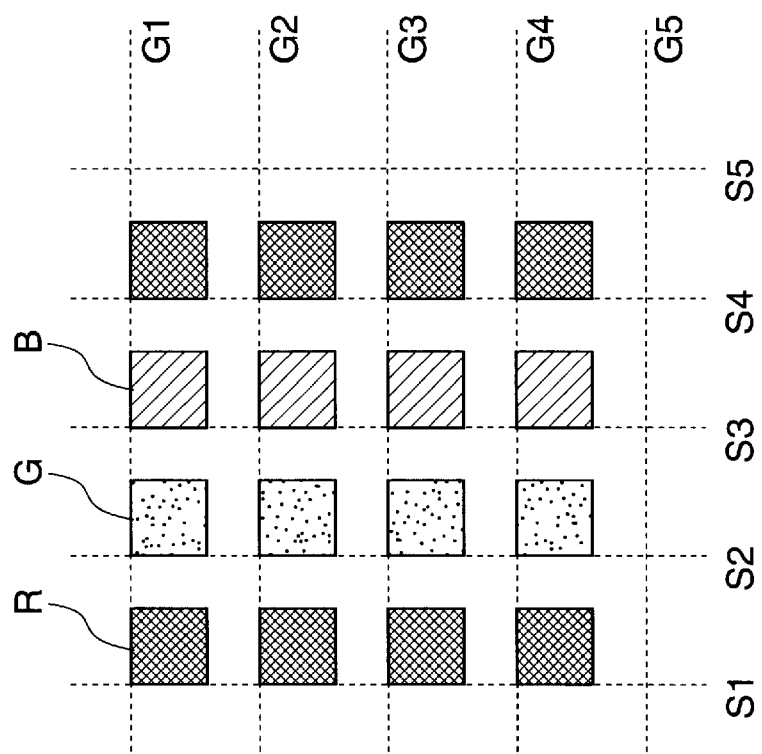
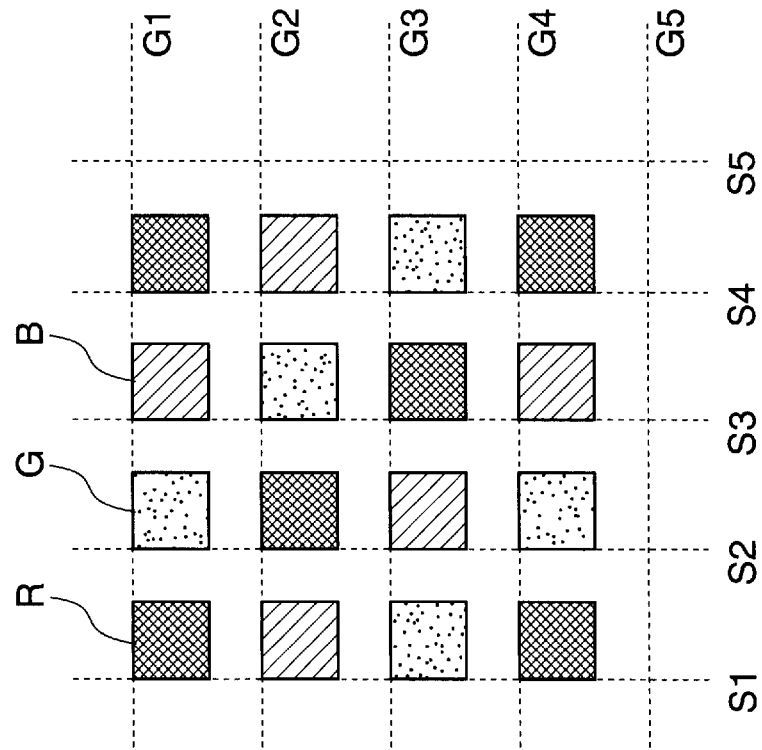

METHOD OF FORMING COLORED FILM, DRIVING DEVICE AND LIQUID CRYSTAL DISPLAY DEVICE

BACKGROUND OF THE INVENTION

1. Field of the Invention

The present invention concerns a method of forming a colored film, a driving device a and liquid crystal display device and, more particularly, it relates to a method of forming a colored film (color filter film) directly to a substrate having an active elements such as a thin film transistor (TFT), a driving device including the colored film and a liquid crystal display device having the driving device.

2. Description of the Related Art

At present, known manufacturing methods for color filters include, for example, (1) a dying method, (2) a pigment dispersing method, (3) a printing method, (4) an ink jet method and (5) an electrodeposition method, which have inherent features and advantages respectively but involve the following drawbacks:

The first dying method requires a photolithographic step for patterning and is poor in light fastness because of the use of a dye and also has a drawback that it requires a number of manufacturing steps.

The second pigment dispersion method also involves a problem of high cost since patterning is conducted by a photolithographic step and a number of steps are required.

The third printing method and the fourth inkjet method require no photolithographic step but the former is poor in the resolution power and the uniformness of the film thickness, while the latter tends to cause color mixing between adjacent filter layers and is poor in view of the resolution power and the positional accuracy.

The fifth electrodeposition method involves a drawback that it requires a patterning step by photolithography such as for forming a common electrode, so that the shape of the pattern is limited and it cannot be used for liquid crystals having TFT.

Further, color filters for liquid crystals cannot generally be used by merely forming a color filter layer and portions between filter cells of respective colors have to be covered with a black matrix, and a photolithographic process is used usually also for the formation of the black matrix, which is one of major factors of cost increase.

Accordingly, it has been demanded for a manufacturing method capable of manufacturing a color filter having a high resolution power and excellent in pattern accuracy, not by way of a photolithographic step, in a simple and convenient step and at low cost. In recent years, a demanded for a display capable of displaying video information and communication information at a high resolution power has increased and a patterned color filter of high fineness has been demanded.

Japanese Published Unexamined Patent Application No. Sho 63-21622 discloses a method of manufacturing a dot matrix type color liquid crystal display device, that is, formation of an RGB color filter in a check pattern by bringing an external electrode selectively into contact with a display electrode of a substrate on the side of an active matrix and electrodepositing a dye on the surface of the display electrode, as a deposited electrode, in contact with the external electrode. Japanese Published Unexamined Patent Application No. Hei 2-153325 discloses a method of manufacturing a display electrode of an active matrix type color liquid crystal display device by forming thin film transistors and color filter forming electrodes corresponding to the thin film transistors respectively on an insulative substrate, then forming a color filter by using the color filter forming electrodes by electrodeposition and forming liquid crystal driving pixel electrodes connected with the thin film transistors on the color filter. Japanese Published Unexamined Patent Application No. Hei 5-257137 discloses a color liquid crystal display device in which a display electrode substrate having plural display electrodes formed on the surface of a first glass substrate and a common electrode substrate having a common electrode formed on the surface of a second glass substrate are opposed to each other by way of liquid crystals, wherein a colored layer is formed by an electrodeposition method on each of the display electrodes.

Japanese Published Unexamined Patent Application No. Hei 10-324994 describes formation of a color filter having mixed color images constituted with a group of pigments on a first electrode in which a relatively low DC voltage at 0.6 to 3.0 V is applied between a first electrode in contact with (or immersed in) an aqueous solution containing dissolved therein two or more of dyes each of an identical polarity containing at least one kind of a dye capable of being deposited solely from the state dissolved in an aqueous solution by electrochemical reactions in a coexistent state at a specified pH value and a second electrode disposed such that the electrochemical reaction can be taken place in cooperation with the first electrode, thereby forming a color filter having mixed color images constituted with the group of dyes on the first electrode. Japanese Published Unexamined Patent Application No. Hei 11-133224 describes formation of a color filter by forming a transparent conductive film on a transparent substrate, and forming thereon an organic or inorganic semiconductor film to form a substrate, preparing an aqueous solution containing an electrodeposition material including a colorant, a dye chemically dissolving or depositing/precipitating depending on the pH change and a water soluble dispersible polymer in a vessel capable of storing a liquid, fixing the substrate that connects a device capable of supplying a current or an electric field with the transparent conductive film such that the thin semiconductor film is immersed in the aqueous solution, disposing a counter electrode as the other of the electrode pair in the aqueous solution and irradiating the substrate thereby depositing an electrodeposition film containing the deposition material selectively to a portion where an electromotive force is generated by the irradiation of light. According to this patent publication, a simple glass substrate is disclosed as the substrate. Further, Japanese Published Unexamined Patent Application No. Hei 11-350193 laid-open after the filing date of this invention in Japan discloses disposing a substrate formed by successively laminating a support, a conductive film and a thin semiconductor film such that at least the thin photosemiconductor film is in contact with the electrolyte, supplying a current or a voltage to the conductive film and irradiating the substrate from the side of the thin photosemiconductor film by way of the electrodeposition solution and selectively generating photoelectromotive force to the irradiated area of the photosemiconductor film thereby forming an electrodeposition film to the irradiated area. In the same manner, Japanese Published Unexamined Patent Application No. Hei 2000-28821 laid-open after the filing date of the present invention in Japan discloses preparation of a filter by immersing, into an electrodeposition solution containing a coloring electrodeposition material, at least a photosemiconductor film of an electrodeposition substrate formed by disposing a transparent thin conductive film and a thin photosemiconductor film having a photovoltaic function in this order on a transparent support, supplying a voltage or current to the conductive film, image-exposing the electrodeposition substrate to form a colored electrodeposition film in an irradiated area and, finally, supplying a current in the state where the electrodeposition substrate is in contact with a metal plating solution thereby forming a black matrix film by metal plating.

By the way, since the liquid crystal display device generally has a structure of using a TFT driving substrate having thin film transistors (TFT), sandwiching liquid crystal materials between the TFT driving substrate and an RGB color filter substrate by way of a transparent conductive film, and controlling the transmissivity of a light to an RGB color filter by ON/OFF control for the application of the voltage to the transparent conductive film, both of the TFr driving substrate and the color filter substrate are required, resulting in increasing the manufacturing cost. That is, since the TFT driving substrate and the color filter substrate are manufactured separately in different manufacturing processes, it has been difficult to reduce the cost for the liquid crystal display device including them in combination.

Further, as described above, since the manufacturing processes are different, it has been difficult for final positioning between both of them and there has been also a problem in view of the stable production of liquid crystal display devices of high resolution power.

As has been described above, it has not yet been provided a method and a driving device capable of manufacturing a liquid crystal display device of high resolution power stably and at low cost, not based on the combination of the TFT. driving substrate and the color filter manufactured separately.

SUMMARY OF THE INVENTION

The present invention dissolves various problems in the prior art and provides a method of forming a colored film by simple and convenient steps and at low cost in which a colored film including a fine pixel pattern of high resolution power and excellent in surface smoothness directly on a substrate having an electronic circuit material.

The present invention further provides a driving device having a colored film of high resolution power and excellent in surface smoothness at low cost.

The present invention further provides a liquid crystal display device having a fine pixel pattern of high resolution power, not based on the combination of a TFT driving substrate and a color filter manufactured separately.

The present invention further provides a method of manufacturing a colored deposition film giving less effect on a driving device when forming a colored film by electrodeposition to the substrate on the driving side of a liquid crystal display device, as well as provides a method of manufacturing a color filter capable of arranging filter of respective RGB colors easily in a check pattern upon manufacture of the RGB color filter.

Some aspects of the present invention are as follows:

<1> A method of forming a colored film including:

a step of forming a substrate for electrodeposition by laminating at least a transparent conductive film and a transparent thin photosemiconductor film having a photovoltaic function in this order on the surface of a substrate having a thin film transistor on a transparent support, and a step of irradiating with a light at least a light photosemiconductor film of the substrate for electrodeposition while bringing the same into contact with an aqueous electrolyte containing an electrodeposition material containing a colorant, thereby selectively a generating photoelectromotive force to an irradiated area of the thin photosemiconductor film and electrochemically depositing the electrodeposition material to form a colored film.

<2> A method of forming a colored film according to one aspect of the present invention, wherein the step of forming a substrate for electrodeposition is a step of forming a conductive film so as to be joined with the electronic circuit material in a region on the surface of the substrate on the side disposed with the thin film transistor in which the electronic circuit material is not disposed and laminating the thin photosemiconductor film at least on the conductive film thereby forming the substrate for electrodeposition.

<3> A method of forming a colored film according to another aspect of the present invention, wherein the step of forming a substrate for electrodeposition is a step of disposing a transparent insulative layer on the surface of the substrate and then laminating at least a conductive film and a thin photosemiconductor film in this order.

<4> A method of forming a colored film according to another aspect of the present invention constituting, after the step of forming a colored film, a step of forming a transparent conductive layer on the surface of the substrate for electrodeposition on the side formed with the colored film, so as to have a current supply channel relative to an electronic circuit material.

<5> A method of forming a colored film according to another aspect of the present invention, wherein the volume electric resistance value of the colored film is from $10^{31\ 3}$ to $10^{12} \Omega \cdot cm$.

<6> A method of forming a colored film according to another aspect of the present invention, wherein the thickness of the colored film is from 0.4 to 4.5 $\mu m$.

<7> A method of forming a colored film according to another aspect of the present invention, constituting, after the step of forming a colored film, a step of heat treating at a temperature from 80 to 250° C.

<8> A method of forming a colored film according to another aspect of the present invention, wherein the electrodeposition material contains a compound having carboxyl groups.

<9> A method of forming a colored film according to another aspect of the present invention, wherein the compound having the carboxyl groups is a polymer having hydrophobic domains and hydrophilic domains and the number of the hydrophobic domains is 30 to 75% of the total number of the hydrophobic domains and the hydrophilic domains.

<10> A method of forming a colored film according to another aspect of the present invention, wherein the hydrophobic domain in the polymer includes a styrene or styrene derivative.

<11> A method of forming a colored film according to another aspect of the present invention, wherein 50% or more for the number of hydrophilic domains in the polymer changes from a water-soluble state to a water-insoluble state or from a water-insoluble state to a water-soluble state depending on the change of pH.

<12> A method of forming a colored film according to another aspect of the present invention, wherein the acid value of the polymer is from 60 to 200.

A method of forming a colored film according to another aspect of the present invention wherein the acid value of the polymer is from 70 to 130 is preferred.

<13> A method of forming a colored film according to another aspect of the present invention, wherein the number average molecular weight of the polymer is from 6,000 to 25,000.

A method of forming a colored film according to another aspect of the present invention wherein the number average molecular weight of the polymer is from 9000 to 20,000 is preferred.

<14> A method of forming a colored film according to another aspect of the present invention, wherein an ion dissociation salt not giving an effect on the electrodeposition characteristic is added to an aqueous electrolyte to make the volume resistivity of the aqueous electrolyte to $10^0$ to $10^5$ Ω·cm in the step of forming a colored film.

<15> A method of forming a colored film according to another aspect of the present invention, wherein pH of the aqueous electrolyte is within a range of ±1.5 relative to pH at which the electrodeposition material starts deposition and 8.5 or less.

<16> A driving device having, on a transparent support, an electronic circuit material, a transparent conductive film connected with the electronic circuit material, a transparent thin photosemiconductor film having a photovoltaic function and covering at least the conductive film, and a colored film disposed on the thin photosemiconductor film.

A driving device further having a transparent conductive layer on at least the colored film is preferred.

<17> A driving device including, on a transparent support, plural thin film transistors arranged orderly, a first common electrode connecting gate electrodes constituting respective thin film transistors in common, a second common electrode connecting source electrodes constituting respective thin film transistors in common, a transparent conductive film connected with drain electrodes constituting respective thin film transistors, a transparent thin photosemiconductor film having a photovoltaic function and covering at least the conductive film, and a colored film disposed on the thin photosemiconductor film.

A driving device further having a transparent conductive layer on at least the colored film is preferred.

<18> A liquid crystal display device including a driving device according to another aspect of the present invention, a transparent conductive plate disposed being opposed to the driving device, and a liquid crystal material disposed between the driving device and the transparent conductive plate.

BRIEF DESCRIPTION OF THE DRAWINGS

Preferred embodiments of the present invention will be described in detail based on the followings, wherein:

FIGS. 10A and 10B are plan views showing a state of arranging a color filter on an active matrix in which FIG. 10A shows a state in which filters of respective colors R, G, B are arranged in a check pattern and FIG. 10B shows a state in which filters of respective colors R, G, B are arranged linearly.

PREFERRED EMBODIMENTS OF THE INVENTION

In the method of forming the colored film according to the present invention, a substrate having an electronic circuit material for driving a liquid crystal material on a transparent substrate is used for the substrate and a colored film (colored electrodeposition film) is formed directly on the substrate.

The method of forming the colored film according to the present invention is to be explained, and the details of the driving device and the liquid crystal display device including the same according to the present invention are also shown.

<Method of Forming a Colored Film>

The method of forming the colored film according to the present invention constitutes a step of laminating at least a transparent conductive film and a transparent thin photosemiconductor film having a photovoltaic function in this order on the surface of a substrate having an electronic circuit material on a transparent support, to form a substrate for electrodeposition (hereinafter sometimes referred to as "electrodeposition substrate forming step"), and a step of irradiating with a light to at least a thin photosemiconductor film of the substrate for electrodeposition while bringing the same into contact with an aqueous electrolyte containing an electrodeposition material containing a colorant, thereby generating a photoelectromotive force selectively to an irradiated area of the thin photosemiconductor film and electrochemically depositing the electrodeposition material to form a colored film (hereinafter sometimes referred to as "a colored film forming step") and, optionally, includes other steps such as a step of forming a transparent conductive layer on the surface of the substrate for electrodeposition formed with the colored film so as to have a current supply channel relative to the electronic circuit material (hereinafter sometimes referred to as "a conductive layer forming step"), a step of applying a heat treatment (hereinafter sometimes referred to as "heat treating step") and a step of forming a black matrix (hereinafter sometimes referred to as "black matrix forming step").

Electrodeposition Substrate Forming Step

In the electrodeposition substrate forming step, at least a transparent conductive film and a transparent thin photosemiconductor film having a photovoltaic function are laminated in this order on the surface of a transparent support having an electronic circuit material on the side of the substrate disposed with the electronic circuit material.

The constitution for the conductive film and the thin photosemiconductor film have no particular restriction and they may be disposed entirely or to a portion of a substrate, so as to cover the electronic circuit material, or to a portion of the substrate. For example, the electrodeposition substrate may be in the form having a cross sectional structure as shown in FIG. 3C. FIG. 3A to FIG. 3E are views showing an example for the method of forming a colored film according to the present invention.

Figure 3A:
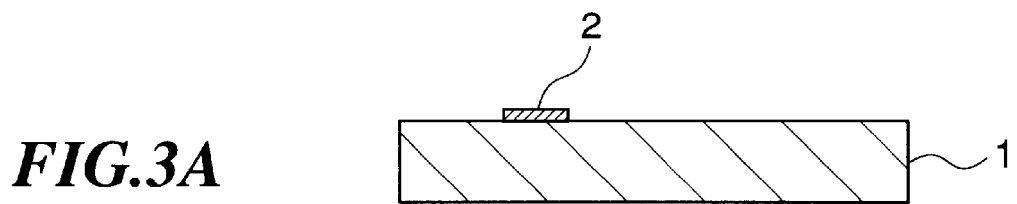
FIG. 3A to FIG. 3E are views showing an example of a method of forming a colored film according to the present invention.
Figure 3B:
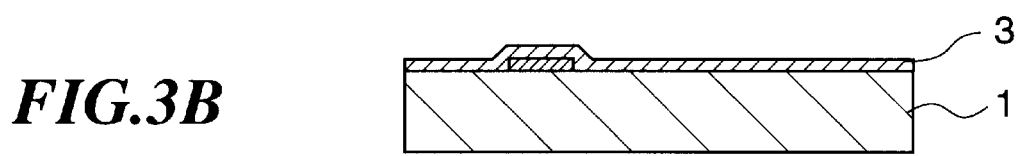
Figure 3C:
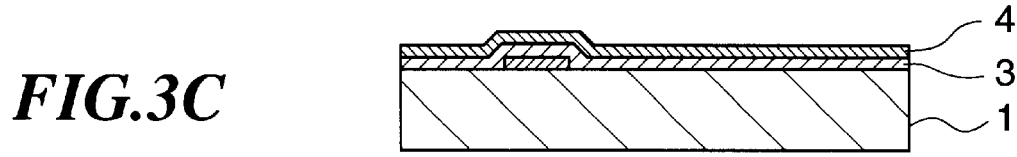

That is, as shown in FIG. 3A to FIG. 3C, a substrate having an electronic circuit material 2 disposed on a transparent support 1 is prepared, a transparent conductive film 3 is formed over the entire surface of the substrate 1 on the side disposed with the electronic circuit material 2 so as to cover the electronic circuit material, and a transparent thin photosemiconductor film 4 may be further laminated on the conductive film 3.

The substrate having the electronic circuit material 2 disposed on a transparent support 1 has no particular restriction and it may be a commercially available product or a substrate prepared by a step of disposing the electronic circuit material on the transparent support provided in this step and the substrate prepared in this step may be used.

The electronic circuit material is, for example, an active element including materials for each of electrodes such as gate electrode, source electrode and drain electrode, insulation film or a semiconductor combined properly and joined with the conductive film on one identical support for providing a switching function and, when a liquid crystal material is combined, it controls liquid crystal display. For example, a thin film transistor (TFT: hereinafter simply referred to sometimes as "TFT") can be mentioned.

As described above, they may be preferably disposed also to a portion of the substrate and, in a preferred embodiment, a transparent conductive film is formed being joined with the electronic circuit material in a region not disposed with the electronic circuit material on the surface of a substrate having the electronic circuit material on a transparent support on the side disposed with the electronic circuit material, and a transparent thin photosemiconductor film having a photovoltaic function is laminated on at least the conductive film.

In this case, a patterned transparent conductive film is formed so as to be joined with the electronic circuit material in a region not disposed with the electronic circuit material of the substrate on the side having the electronic circuit material, that is, on the surface of the support. Then, the thin photosemiconductor film may be laminated only on the conductive film or only to a region containing the conductive film, or it may be laminated over the entire surface of the substrate on the side disposed with the electronic circuit material and the conductive film. For example, it may be an electrodeposition substrate as an embodiment shown in FIG. 4C. FIG. 4A to FIG. 4E are views showing an example for the method of forming the colored film according to the present invention.

Figure 4A:
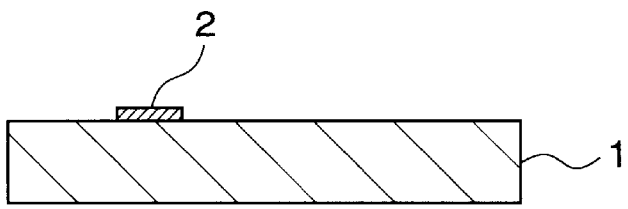
FIG. 4A to FIG. 4E are views showing an example of a method of forming a colored film according to the present invention.
Figure 4B:
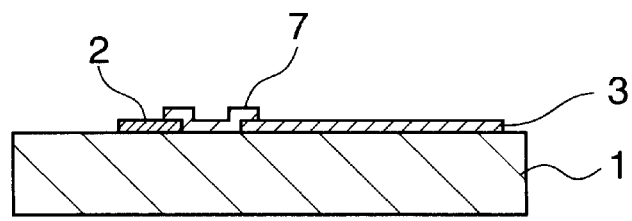
Figure 4C:
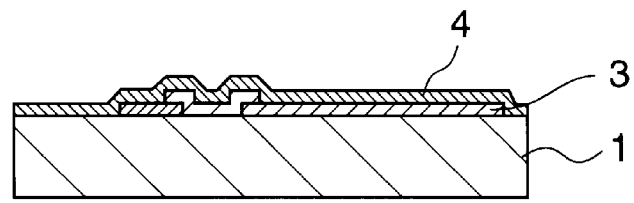

That is, as shown in FIG. 4A to FIG. 4C, a substrate having an electronic circuit material 2 disposed on a transparent support 1 is prepared, a patterned transparent conductive film 3 is formed on the surface of a support 1 constituting a substrate on the side disposed with the electronic circuit material 2, the conductive film 3 is joined with the electronic circuit material 2 by way of a conduction channel 7 and then a transparent thin photosemiconductor film 4 is laminated over the entire surface of the substrate. In this case, the conduction channel 7 may be a drain electrode constituting the electronic circuit material as described above. Further, also in this embodiment, the substrate may be a commercially available product or the substrate prepared by a step of disposing an electronic circuit material on the transparent support for the substrate.

The conductive film can be patterned by a known method such as photolithography.

Figure 5A:
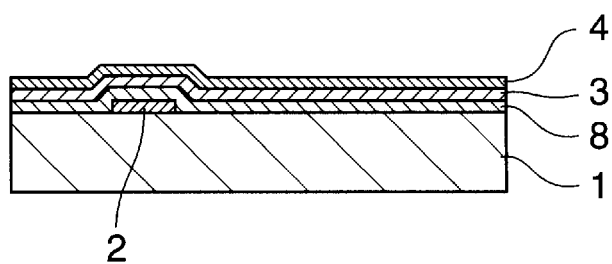
FIG. 5A is a cross sectional constitutional view illustrating an example of an electrodeposition substrate having an insulative layer and FIG. 5B is a schematic cross sectional view showing an example of a structure of a driving device after forming a colored film and a conductive layer.
Figure 7A:
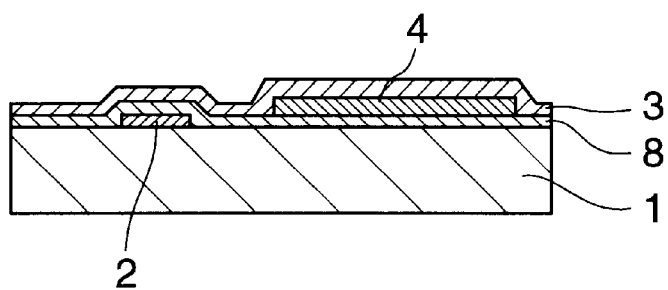
FIG. 7A is a cross sectional constitutional view illustrating an example of an electrodeposition substrate having an insulative layer and FIG. 7B is a schematic cross sectional view showing an example of a structure of a driving device after forming a colored film and a conductive layer.

Further, in this step, it is also a preferred embodiment of forming an insulative film to cover the electronic circuit material before forming the conductive film on the substrate having the electronic circuit material disposed on a transparent support. The constitution of the insulative film has no particular restriction providing that the film is formed to cover the electronic circuit material and, for example, it may be an electrodeposition substrate in the form having a cross sectional structure shown in FIG. 5A or FIG. 7A.

With a view point of preventing occurrence of noises or induction electrolysis to the electronic circuit material to be driven, it is preferred to dispose the insulative film while covering the electronic circuit material.

(Substrate)

A substrate having an electronic circuit material disposed on a transparent support is used as a substrate used for the method of forming the colored film according to the present invention. For example, as shown in FIG. 3A, only the electronic circuit material such as an active element may be disposed on a transparent support 1.

The constitution for the substrate has no particular restriction and, for example, it may be (1) a substrate in which an active element having a source electrode, a drain electrode and a gate electrode are disposed on one identical support, transparent conductive film is disposed subsequently in adjacent with the active element and the drain electrode is electrically connected with the conductive film, or (2) a substrate in which a transparent conductive film and an active element having a source electrode, a drain electrode and a gate electrode in adjacent with the conductive film are disposed in a two dimensional matrix form, the source electrode is electrically connected with a first common electrode and the gate electrode is connected with a second common electrode. Specifically, it may be a substrate in which active element are arranged in the constitution shown in FIG. 6.

Figure 6:
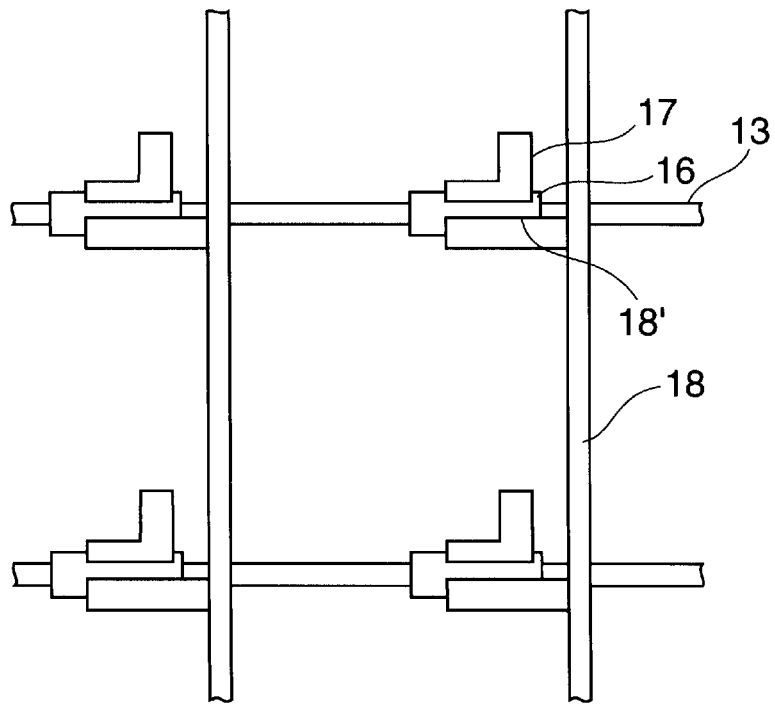
FIG. 6 is a view showing an example for the constitution of an electronic circuit material.

The substrate shown in FIG. 6 has a constitution in which a gate electrode 13 and a semiconductor 16 formed by way of an insulative film on the gate electrode 13 are laminated on one identical glass support, and a drain electrode 17 is connected with the semiconductor 16. Further, the drain electrode 17 is joined also with a transparent conductive film disposed subsequently on the support and connected also with a source electrode 18 with an electrode 18' by way of the semiconductor 16.

(Support)

Various transparent materials can be used for the support and can include suitably, for example, glass and plastics.

(Conductive Film)

Electroconductive and transparent materials can be used generally as the conductive film. For example, the material can include metals such as Al, Zn, Cu, Fe, Ni, Cr, Mo and metal oxides such as ITO (indium tin oxide) and tin dioxide. Further, conductive carbon materials or conductive ceramic materials may also be used. The conductive film can be formed on a support by a known method, for example, a vapor deposition method, a sputtering method and a CVD method.

The thickness of the conductive film is preferably from 500 Å to 3 $\mu$m and, more preferably, from 1000 Å to 5000 Å.

(Thin Photosemiconductor Film)

Any of the material generating a photoelectromotive force by irradiation with a light can be used for the thin photosemiconductor film. While photosemiconductors have a light hysteresis effect of retaining the effect of the light irradiation for a predetermined period of time, those having less light hysteresis effect are preferred as the photosemiconductor used in the present invention. Even those having intense light hysteresis effect can be used by reducing the thickness of the thin photosemiconductor film since this tends to lower the light hysteresis effect.

The photosemiconductor includes n-type photosemiconductor and p-type photosemiconductor and photosemiconductors of both of the types can be used in the present invention. Use of a thin photosemiconductor film of a laminate structure such as a thin photosemiconductor film having a pn junction formed by laminating an n-type photosemiconductor thin film and a p-type thin photosemiconductor film or a thin photosemiconductor film having a pin junction formed by laminating an n-type thin photosemiconductor film, an i-type thin photosemiconductor film and an n-type thin photosemiconductor film is preferred since photocurrent at high power can be obtained reliably and an image contrast is further increased.

Further, the thin photosemiconductor film used in the present invention may have an inorganic photosemiconductor or an organic photosemiconductor.

Inorganic photosemiconductor can include, for example, titanium oxide, silicon carbide, zinc oxide, lead oxide, nickel oxide, tin oxide, molybdenum oxide, Si, GaN, a—C, BN, SiC, ZnSe, $TiO_2$, GaAs series compound, CuS and $Zn_3P_2$.

The organic photoconductor, can include, for example, phthalocyanine series pigment, perylene series pigment, azo series pigment, polyvinyl carbazole and polyacetylene.

They are desirably at high purity or of single crystal type when used alone but may be a mixture of them or a plural thin photosemiconductor films formed of each of the materials may be laminated.

Among them, meal oxides such as $TiO_2$ and ZnO are suitable in a repeated use since they are excellent in stability upon electrodeposition and also excellent in the light irradiation efficiency.

It has been found in the recent study that satisfactory n-type thin photosemiconductor film can be obtained with $TiO_2$ by preparing a film by various methods such as a sol-gel method, a sputtering method or an electron beam vapor deposition method.

For improving the conversion efficiency of photocurrent, a reducing treatment is effective and, usually it is heated in a hydrogen gas at about 550° C. For example, this can be attained by heating for 10 min at about 300° C., while flowing a 3% hydrogen mixed nitrogen gas at a flow rate of one liter per one minute.

The thin photosemiconductor film can be formed on the conductive film, for example, by a sol-gel method, a sputtering method, an electron beam vapor deposition method, an ion coating method or a glow discharge deposition method known so far.

The thickness of the thin photosemiconductor film has no particular restriction and a thickness from 0.04 to 3.0 $\mu$m is preferred for obtaining favorable characteristics.

If the thickness is less than 0.04 $\mu$m, current caused by the resulting photoelectromotive force is excessively weak to sometimes result in a problem in pattern (image) formation. On the other hand, if it exceeds 3.0 $\mu$m, static charges formed by light irradiation are trapped in the film to increase the light hysteresis effect, so that a pattern forming property is sometimes worsened.

For the thin photosemiconductor film, those having finely crystalline or polycrystaline film quality are preferred in view of the generation efficiency of the photoelectromotive force. Further, those including only the photosemiconductor are preferred and those not containing insulative materials such as resin are preferred. If an insulative material such as a resin is mixed with the thin photosemiconductor film, this lowers the generation efficiency of the photoelectromotive force and increases the light hysteresis effect.

The volume resistivity value of the thin photosemiconductor film under the irradiation of light is preferably from $10^{-2}$ to $10^8$ $\Omega \cdot$cm and, particularly, preferably, from $10^0$ to $10^6$ $\Omega \cdot$cm.

When the volume resistivity of the thin photosemiconductor film exceeds $10^8$ $\Omega \cdot$cm, a high voltage is required for current supply, so that the generation efficiency of the photoelectromotive force is sometimes lowered remarkably.

(Insulative film)

The insulative film is an electrically insulating film and the material therefore can include, for example, a-$SiN_x$, a-SiO, $SiO_2$ and $Si_2O_4$, which can be formed by a known method such as a sputtering or plasma CVD method.

The thickness of the insulative film is preferably from 500 Å to 50 $\mu$m and, more preferably, from 1000 Å to 10 $\mu$m.

Colored Film Forming Step

In the colored film forming step, at least the thin photosemiconductor film of the substrate electrodeposition is put to light irradiation while being in contact with an aqueous electrolyte containing an electrodeposition material containing a colorant to selectively generate a photoelectromotive force to a light irradiation area of the thin photosemiconductor film, and the electrodeposition material is electrochemically deposited to form a colored electrodeposition film only in the light irradiation area and form a colored film (color filter film).

At first, at least the thin photosemiconductor film of the substrate for electrodeposition having the electronic circuit material, the conductive film and the thin photosemiconductor film on one identical support is brought into contact with an aqueous electrolyte containing the electrodeposition material containing the colorant.

When the thin film is brought into contact with the aqueous electrolyte, the electronic circuit material, that is, electrodes such as a source electrode, a drain electrode and a gate electrode constituting a thin film transistor (TFT) or the like tends to be deteriorated upon contact with water, and tends to be short-circuited upon TFT driving, so that it is preferably applied with an insulation treatment beforehand. However, additional insulation treatment described above is not always necessary when an insulation treatment is applied to the electronic circuit material itself. The method for the insulation treatment is to be described later.

When at least the thin photosemiconductor film of the electrodeposition substrate is brought into contact with the aqueous electrolyte, the positional relationship thereof to the aqueous electrolyte can be selected optionally and, for example, the substrate may be entirely immersed and disposed in the aqueous electrolyte, or it may be disposed such that a portion of the substrate, for example, only the thin photosemiconductor film forming the colored film is brought into contact therewith.

The method for the insulation treatment can include, for example, a method of coating a resin solution in which a UV-ray curable resin is dissolved in an appropriate solvent, irradiating the entire surface by a UV-ray lamp while masking only the portion of the thin photosemiconductor film thereby curing the same and then decomposing and developing the same by a solvent to dissolve and remove the resin solution in an unnecessary portion and a method of surface coating a negative type photoresist solution by a coating apparatus such as a spinner, prebaking the same and then exposing the thin photosemiconductor film, decomposing and developing the same by a solvent and curing the unexposed area by post baking.

In a case when the insulation treatment is applied as described above, a black colorant may be incorporated in the insulative material used to form a black insulation film thus to prepare a black matrix. A black colorant usable in this case can include, for example, carbon black and insulative pigment.

However, since the portion disposed with the active element is not transparent, the black matrix is formed optionally.

In the colored film forming step according to the present invention, after bringing at least the thin photosemiconductor film of the substrate for electrodeposition in contact with the aqueous electrolyte, light is irradiated on the substrate to generate a photoelectromotive force selectively to the irradiated area of the thin photosemiconductor film and an electrodeposition material in the aqueous electrolyte is deposited to form a colored film (hereinafter sometimes referred to as "colored deposition film").

That is, the principle for forming the colored electrodeposition film is based on the film forming technique using the electrodeposition technique and utilizes a principle of electrochemically oxidizing/reducing water soluble molecules directly, or of properly changing pH of an aqueous solution in which water soluble molecules are disposed thereby enabling transition between each of the states taking notice on molecules whose solubility to water can vary greatly in each of oxidized state, neutral state and reduced state among the water soluble molecules.

For example, a water soluble acrylic resin as a sort of polymeric compounds having carboxyl groups is dissolved in water at pH of 7 or higher but precipitated in a pH range less than the above. Then, when the acrylic resin and a pigment are dispersed, electrodes are immersed therein and applied with a voltage in the same manner as described above, the pigment and the acrylic resin are deposited on the anode to form an electrodeposition film as a mixture of the pigment and the acrylic resin.

The electrodeposition film formed as described above can be dissolved again into the aqueous solution by applying a voltage of an opposite polarity or by immersing the same into an aqueous solution at pH from 10 to 12.

However, it is necessary to apply a voltage higher than a predetermined threshold value in the formation of the colored electrodeposition film since the electrodeposition film is not always formed by merely supplying an electric current. Accordingly, when a bias voltage is previously applied, a colored electrodeposition film can be formed even if the level of the voltage inputted from the outside should be low, and a desired colored electrodeposition film can be formed by controlling the input voltage level used.

In this case, a colored electrodeposition film can be formed to a desired position and an optional image pattern can be formed by utilizing a semiconductor material for a substrate to be formed with the colored electrodeposition film and using it as an electrode, using a fight as the input signal and, further, controlling application of a light.

Specifically, as described above, a color filter of a monocolor having a color filter layer of a desired image pattern can be formed, by providing an aqueous electrolyte vessel containing a solution in which an electrodeposition material containing a pigment or a dye whose solubility changes greatly depending on the change of the liquid status dissolved or dispersed in an aqueous solvent (that is, an aqueous electrolyte), irradiating on the semiconductor material with a light so as to correspond to a desired image pattern in a state of contacting or immersing an organic or inorganic semiconductor material as an electrode in the aqueous electrolyte in the vessel, thereby depositing the electrodeposition material in the aqueous electrolyte on the semiconductor material. A color filter of multi-color can be formed by repeating the procedures using aqueous electrolytes of red, green and blue colors respectively.

Accordingly, a previously patterned conductive film as in the existent electrodeposition method is not required and an optional image pattern can be formed smoothly at a. high resolution power by a simple and convenient method at low cost not by way of a photolithographic step.

Further, when a conductive electrodeposition material is used as the electrodeposition material in the aqueous electrolyte, an electroconductive deposition material can be deposited on the semiconductor material used as the electrode and a conductive colored film can be formed.

pH of the aqueous electrolyte before irradiation of light is preferably set within a range of ±1.5 relative to pH at which the change of the state is caused for the electrodeposition material in a case of anodic deposition, while it is set within a range of less than −1.5 relative to pH at which the change of the state is caused for the electrodeposition material in a case of cathodic deposition, and pH is preferably of 8.5 or less.

That is, it is preferred that the electrodeposition material exhibits a sufficient solubility to the aqueous solvent used for the electrolyte and, at the same time, the change for the electrolyte forming a supernatant liquid and causing precipitation from the dissolved or dispersed state due to pH change of the electrolyte is within a range of pH 3.0. It is further preferred to be within 1.5.

If pH of the aqueous electrolyte is set within such a range, dissolution of the electrodeposition material to the aqueous solution is saturated before forming the colored electrodeposition film. As a result, once the colored electrodeposition film is formed, it is less redissolved into the aqueous electrolyte after the film formation and a highly transparent colored electrodeposition film can be formed stably. On the other hand, in a case where the electrodeposition material is in an unsaturated state, that is, in a case where the pH of the electrolyte is not within the range described above upon forming the colored electrodeposition film, it may possibly result in lowering of the film deposition rate or, even when the colored electrodeposition film is once formed, the film is redissolved again possibly upon interruption of the current supply.

For controlling pH of the electrolyte, it is preferred to form the colored film by adding an acidic or alkaline substance giving no effect on the electrodeposition characteristic and lowering the bias voltage down to 5V, and it is more preferred to form the colored film by lowering the bias voltage to 2V or lower.

Further, with a view point that a highly clear colored film with sharp edge portion can be formed, it is preferred that the temperature of the aqueous electrolyte used for electrodeposition is kept at a constant temperature and the colored film is formed at a constant electrodeposition rate. As described later, the situation is similar also in a case of forming a black matrix by using an electrolyte containing a black colorant or a metal.

With an aim of increasing the electrodeposition rate, an ion dissociation salt giving no effect on the electrodeposition characteristic may be added in addition to the electrodeposition material into the electrolyte, and addition of the salt increases the electroconductivity of the solution.

The electroconductivity and the electrodeposition rate (that is, electrodeposition amount) in the aqueous system have a correlation in which the thickness of the electrodeposition film deposited for a predetermined period of time increases as the conductivity is higher and it tends to be saturated as the conductivity increases to about 100 mS/cm$^2$ (corresponding to 10 Ω·cm) or more. Accordingly, addition of ions giving no effect on the formation of the colored film in the electrolyte, for example, $Na^+$, $NH_4^-$, $Cl^-$, $PO_4^-$ or $SO_4^-$, can control the electrodeposition rate.

Further, pH of the electrolyte also has an effect on the property of forming the deposited film. For example, when the film is formed under the condition of conducting film formation instantaneously, high molecular weight materials show dense cohesion and the film is less redissolved after the formation. On the other hand, if the film is formed slowly in an unsaturated state, the film starts to be redissolved at the instance the current supply is terminated, failing to obtain a colored film of good film property. Accordingly, it is desirable to form the deposited film at such pH value that dissolution of the electrodeposition material into the aqueous solvent is saturated.

When the salt described above is added to control the volume resistivity in the electrolyte, the volume resistivity is preferably from $10^0$ to $10^5$[Ω·cm] with a view point of favorably conducting film deposition.

If the volume resistivity is less than $10^0$ Ω·cm, the deposition amount cannot sometimes be controlled. On the other hand, if it exceeds $10^5$ Ω·cm, sometimes no sufficient current cannot be obtained, failing to obtain a colored film of a sufficient deposition amount.

When the non-ionic molecules such as a pigment and an electroconductive material are combined, a colored film including the pigment can be obtained by using a water soluble acrylic resin or a water soluble styrene resin as a transparent polymeric material capable of forming a film and using a solution in which the resin is mixed or dispersed together with the pigment.

The thickness of the colored film formed in this step is preferably from 0.4 to 4.5 μm and, more preferably, from 0.5 to 1.9 μm.

If the film thickness is less than 0.4 μm, it may occur that no smooth film can be formed, to cause defects in the film. If it exceeds 4.5 μm, the thickness controllability may be sometimes reduced.

The volume resistivity of the colored film is preferably from $10^{-3}$ to $10^{12}$ Ω·cm and, more preferably, from $10^{-1}$ to $10^5$ Ω·cm.

If the volume resistivity is less than $10^{-3}$ Ω·cm, the film cannot sometimes be formed stably upon electrodeposition and, on the other hand, if it exceeds $10^{12}$ Ω·cm, it is sometimes difficult to control the thickness and to increase the thickness.

The volume resistivity can be controlled as described later by incorporating a conductive material in the electrolyte.

The change of pH in the aqueous electrolyte near the substrate and the mechanism for forming the colored film (colored electrodeposition film) along with the pH change is to be explained.

Generally, when a platinum electrode is immersed in an aqueous solution and a current or a voltage is applied, $OH^-$ ions in the aqueous solution near the anode are consumed to form $O_2$ and hydrogen ions increase to lower the pH value. This is because the following reaction is taken place in which holes (p) and $OH^-$ ions are combined near the anode:

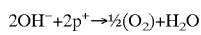

$2OH^- + 2p^+ \rightarrow \frac{1}{2}(O_2) + H_2O$

However, for the occurrence of the reaction, it is required that the potential of the substrate exceeds a predetermined value (threshold potential). Only when the threshold voltage is exceeded, the reaction progresses and the pH in the aqueous solution changes (pH lowers near the anode and pH increases near the cathode).

When the colored film is formed in the present invention, a photoelectromotive force is caused to the photosemiconductor by the irradiation, to make the potential exceed the threshold potential only at the irradiated area and progress the reaction in the aqueous electrolyte only near the irradiated area of the substrate. As a result of the progress of the reaction, the pH of the aqueous electrolyte near the irradiated area changes and, correspondingly, the solubility of the electrodeposition material changes and a colored film is formed only in the irradiated area.

Various attempts of causing the electrochemical reaction by utilizing the photoelectromotive force described above have been studied so far. For example, A. Fujishima and K. Honda reported in Nature vol. 238, p37 (1972) an example of irradiating an n-type photosemiconductor $TiO_2$ with a light and conducting electrolysis of water by the resultant photoelectromotive force. Further, H. Yoneyama, et al reported, in J. Electrochem. Soc., p.2414 (1985), an example of irradiating an Si substrate with a light, electrolytically polymerizing pyrrole by the resultant photoelectromotive force and forming images by doping/dedoping. Further, we also filed a patent application for the method of using a dye for doping/dedoping of a conductive polymer and forming images by light. However, when the images are formed with a conductive polymer by utilizing the photoelectromotive force, there is a limit for the color forming material that can be used. As a result, it was difficult to form images of multi-colors.

While the colored film can be formed even in a system in which the conductive polymer is not present, a voltage required for forming a colored film increases compared with a case where the conductive polymer is present. For instance, Japanese Published Unexamined Patent Application No. Hei 5-129209 under the title of "Method of Manufacturing a Color filter and Electrodeposition Substrate for Manufacture of Color Filter" and Japanese Published Unexamined Patent Application No. Hei 5-157905 under the title of "Method of Manufacturing Color Filter" disclose the technique of irradiating a thin photosemiconductor film with a light and forming a colored electrodeposition film by utilizing the photoconductivity developed in the irradiated area, but the applied voltage is from 20 V to 80 V and oxidation/reduction reaction of the polymer is utilized for the electrodeposition material. On the other hand, the photoelectromotive force of the thin photosemiconductor film is less than 1 V (for example, about 0.6 V for Si), and the use of the photoelectromotive force is insufficient for forming the image. Although it may be considered to previously bias the potential by supplying a current or a voltage, if a voltage is applied exceeding a predetermined level (voltage corresponding to the band gap of a photosemiconductor used) (a voltage in excess of 5 V, for example, to Si), a Schottky barrier between the semiconductor and the electrolyte is broken, failing to form the images. In the present invention, oxidation/reduction for the polymer is not utilized for the electrodeposition and, as described above, the colored film is formed utilizing the change of the solubility of the electrodeposition material corresponding to the change of pH in the electrolyte, so that electrodeposition is possible within a range not destructing the Schottky barrier.

In the present invention, a voltage may be applied previously to the substrate (conductive film on the substrate). The bias voltage applied in this case is set to a level such that the potential developed to the substrate by the photoelectromotive force generated in the thin photosemiconductor film is compensated and the potential of the substrate reaches the threshold potential. Further, the bias voltage applied is set to a level not exceeding the Schottky barrier. If the voltage applied previously to the substrate is excessively high, the Schottky barrier is broken and current flows also to the region not irradiated with light and the electrodeposition film is formed over the entire region of the photosemiconductor substrate, so that the position for forming the colored film cannot be controlled.

For example, since the photoelectromotive force of $TiO_2$ is about 0.6 V, for the electrodeposition material electrodeposited at 2.0 V, when irradiation is performed under the application of a bias voltage at 1.5 V, the potential at the irradiated area of the substrate (photosemiconductor film) is 0.6 V+1.5 V=2.1 V, which exceeds a threshold potential required for electrodeposition, so that the colored film is formed only in the irradiated area. On the other hand, when a bias voltage in excess of 2.5 V is applied to the substrate, the Schottky barrier is broken.

Then, combination of the photosemiconductor and the electrodeposition material is to be explained.

Figure 1:
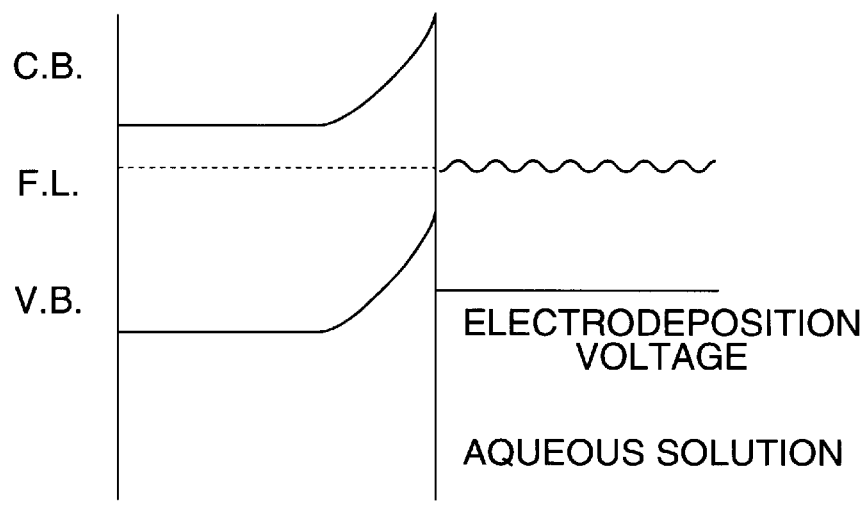
FIG. 1 is a view for explaining an energy band of a photosemiconductor.
Figure 2:
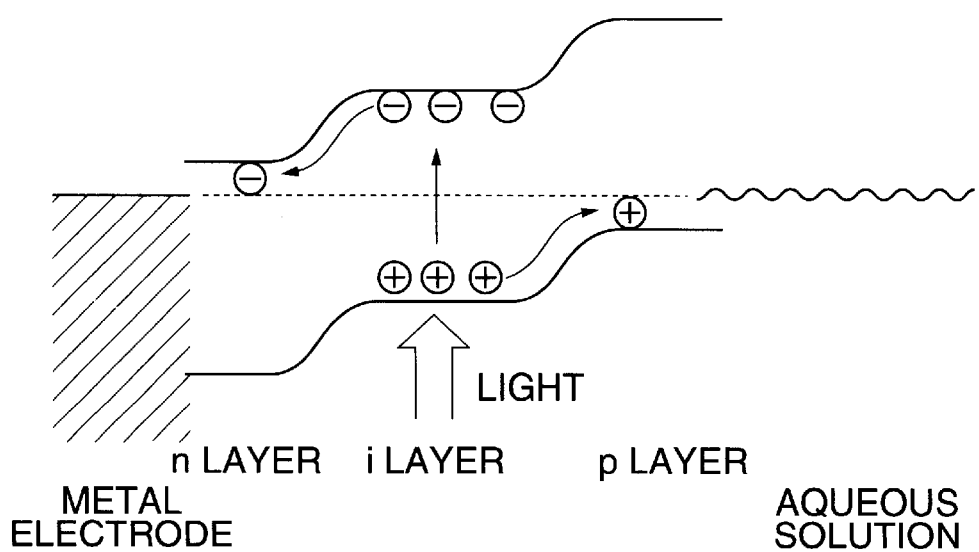
FIG. 2 is a schematic cross sectional view showing a structure of a transparent n-type semiconductor.

In the present invention, a Schottky barrier or a barrier of pn junction of a pin junction formed to the boundary in contact with the photosemiconductor is utilized for forming the photoelectromotive force. FIG. 1 schematically shows a Schottky barrier formed at the boundary between an n-type photosemiconductor and an electrolyte and FIG. 2 schematically shows an energy band of a pin junction.

For example, in a case of using an n-type photosemiconductor, when the n-type photosemiconductor is rendered negative, current flows since the flow of the current is in a forward direction. On the contrary, when the n-type photosemiconductor is rendered positive, the Schottky barrier between the n-type photosemiconductor and the aqueous electrolyte forms a barrier and the current does not flow. However, even in a state where the n-type photosemiconductor is positive and the current does not flow, when irradiation is performed, electron/hole pairs are generated from the n-type thin photosemiconductor film and holes move toward the solution, so that current flows. In this case, since the p- type photosemiconductor is rendered at a positive potential, the electrodeposited material should be anionic molecules. Accordingly, the n-type photosemiconductor and the anionic molecule are combined. On the contrary, in the case of the p-type photosemiconductor, cations are electrodeposited. It is particularly preferred to use a coloring electrodeposition material containing anionic molecules having carboxyl groups in a case of using the n-type photosemiconductor and a coloring electrodeposition material containing cationic molecules having amino groups or imino groups in a case of using the p-type semiconductor.

A current or a voltage can be supplied to the conductive film by disposing a current supply channel to the side edge of the photoconductive film for supplying the current or voltage. A potentiostat or the like can be used for supplying the current or the voltage.

<Aqueous Electrolyte>

For the aqueous electrolyte described above, an aqueous electrolyte in which an electrodeposition material containing a colorant is dispersed or dissolved in an aqueous solvent is used.

Electrodeposition Material

The electrodeposition material includes at least an ionic molecule whose solubility changes corresponding to the change of pH in the solution and a colorant such as a dye or pigment for coloring the electrodeposition film to a desired color and optionally contains also other ingredients. Further, it may be a conductive electrodeposition material by the incorporation of a conductive material, or the electrodeposition material can be formed by using the conductive coloring material as the colorant with or without corporation of the conductive material.

It is not always necessary that the colorant itself is capable of electrodeposition and the colored film may be formed by coagulation and deposition while incorporating the colorant upon electrodeposition of the ionic molecule. Further, when the colorant itself is an ionic molecule and capable of electrodeposition, the electrodeposition material may solely include the colorant. In this case, when an electrodeposition material containing a pigment as the colorant and containing the ionic polymer is used, it is particularly preferred since the light fastness of the formed colored film can be improved.

The ionic molecule may be either an anionic molecule having anion dissociating groups or a cationic molecule having cation dissociating groups.

The cationic or the anionic molecule for the electrodeposition material can be selected with reference to the characteristic of the solubility change corresponding to the change of pH inherent to the ionic molecule. It is preferred that the electrodeposition material used in the present invention has a nature that the solubility changes abruptly depending on the pH change of the solution. For example, a material that changes the state corresponding to the pH change of the solution for ±2.0, more preferably, pH change for ±1.0 (dissolved state→precipitation, or precipitation→dissolved state) is preferred. When the ionic molecule having such a solubility characteristic is used for the electrodeposition material, the electrodeposition film can be prepared more rapidly and an electrodeposition film excellent in waterproofness by strong coercive force can be prepared.

Further, it is preferred that the ionic molecule used for the electrodeposition material shows hysteresis in the change of state corresponding to the change of pH (change of dissolved state→deposition, and change of deposition→dissolved state). That is, it is preferred that the change to the deposition state corresponding to decrease or increase of pH is abrupt and the change to the dissolved state corresponding to increase or decrease of pH is slow since this can improve the stability of the colored film.

The ionic molecule can include an anionic polymer compound having carboxyl groups as anionic dissociation groups; and a cationic polymer compound having amino groups or imino groups as cationic dissociation groups.

In the present invention, the ionic molecule used for the electrodeposition material is preferably a compound having carboxyl groups and the compound having the carboxyl groups is preferably a polymer having hydrophobic domains and hydrophilic domains.

Among the polymers described above, a copolymer of a hydrophilic monomer (hydrophilic domain) and a hydrophobic monomer (hydrophobic domain) having ionic dissociation group is preferred and, among all, block copolymer, random copolymer, graft copolymer or a mixture of a block copolymer and a graft copolymer or a random copolymer is preferred. Further, in a case of using a substrate having an active element joined with a transparent conductive film as a substrate and forming a colored film by utilizing a driving voltage upon driving the active element, a block copolymer or a mixture of a block copolymer and a graft copolymer is most preferred with a view point of improving the dispersibility of the colorant.

As the block copolymer described above, particularly preferred are a diblock copolymer represented by AAA—BBB and a triblock copolymer represented by BBB—AAA—BBB for the block part including a hydrophobic monomer A and a block part including a hydrophilic monomer B, assuming the hydrophilic monomer as A and the hydrophobic monomer as B since the dispersibility of the colorant is favorable. Further, a graft copolymer having a polymer main chain represented by AAAAAA to which plural side chains represented by BBBBBB are bonded is particularly preferred as the graft copolymer.

This is considered that since the hydrophobic block part including A acts as an absorptive group to the surface of a pigment showing hydrophobicity and, at the same time, high molecular chains are properly entangled with each other on the surface of the pigment to cover the surface with a polymer of an appropriate thickness, so that coagulation between each of adjacent pigments can be prevented.

In this case, the hydrophilic block part including B has an affinity with water and acts to assist the dispersion stability of the pigment in an aqueous electrolyte. Accordingly, the water insoluble pigments can be kept in a stably dispersed state with no coagulation to each other.

The hydrophilic monomer having anionic dissociation groups can include, for example, monomers having a carboxyl group, for example, methacrylic acid, acrylic acid, hydroxyethyl methacrylate, acrylamide, maleic acid anhydride, trimellitic acid anhydride, phthalic acid anhydride, hemimellitic acid, succinic acid, adipic acid, propiolic acid, propionic acid, fumaric acid and itaconic acid, as well as derivatives thereof.

Among them, methacrylic acid, acrylic acid and derivatives thereof are preferred since the ionic polymer having the same as the monomer shows abrupt change of state depending on pH change and has high hydrophilicity to an aqueous liquid.

The monomer having a cationic dissociation group can include, for example, monomers having an ammo group or imino group such as primary amine, secondary amine, tertiary amine, quaternary amine, oxazoline, alkyl amine, alkyl imine, polyimine and polyamine.

The cationic polymer having the cationic dissociation groups may be a polymer introduced with cationic dissociation groups such as amino group or imino group.

Preferred hydrophilic monomers are those containing an ionic dissociation groups at a ratio of 30 to 75% by weight in the molecular structure. Further, two or more kinds of hydrophilic monomers may be used in combination.

The hydrophobic monomer (hydrophobic domain) can include, for example, olefin such as butadiene, styrene, α-methyl styrene, α-ethyl styrene, methyl methacrylate, ethyl methacrylate, butyl methacrylate, acrylonitrile, methyl acrylate, ethyl acrylate, butyl acrylate or lauryl methacrylate, and derivatives thereof, phenylene derivatives and naphthalene derivatives.

Among them, styrene a-methyl styrene and derivatives thereof are preferred in that they have high hydrophobic efficiency, favorable electrodeposition efficiency and high controllability upon copolymerization of the hydrophilic monomer.

Two or more kinds of the hydrophobic monomers may be used in combination.

When the ionic polymer is used together with the colorant, an ionic polymer capable of forming a transparent electrodeposition film is preferred since this does not hinder the coloration of the colorant. For example, a water soluble acrylic resin is preferred.

In view of the above, styrene—(meth)acrylic series copolymers are particularly preferred among the ionic molecules described above in that the change of state depending on pH change is abrupt and the hydrophilic property is high.

It is necessary that the ionic polymer has an appropriate hydrophilic property with a view point of the solution stability to the electrolyte and it is necessary to have an appropriate hydrophobic property with a view point of film strength and waterproofness of the electrodeposition film.

The balance between the hydrophobic property and hydrophilic property required for the ionic polymer used as the electrodeposition material can be expressed, for example, by the number of hydrophobic domains and the number of the hydrophilic domains of the monomer unit as described below.

That is, in a case where the ionic polymer is a copolymer of a hydrophobic monomer and a hydrophilic monomer, the number of the hydrophobic domains to the sum of the number of the hydrophobic domains and the number of the hydrophilic domains of the monomer unit is preferably from 30 to 75% and, more preferably, from 55 to 70%.

If the ratio for the number of the hydrophilic domains is less than 30%, the waterproofness and the strength of the electrodeposition film is sometimes insufficient. On the other hand, if it exceeds 75%, the affinity of the ionic polymer to the aqueous solution is sometimes lowered, failing to be dissolved by an appropriate amount, or it causes precipitation or increases the viscosity of the electrolyte excessively and no uniform electrodeposition film can be formed. On the other hand, when the number of the hydrophobic domains is within the range described above, the affinity with the aqueous solvent is high, the solution property of the electrolyte is stabilized and the electrodeposition efficiency is also high.

On the other hand, referring to the hydrophilic group, it is preferred that 50% or more for the number of the hydrophilic groups can change reversibly from water soluble to water insoluble property or vice versa depending on the pH change.

If the number of the hydrophilic groups is less than 50%, solubility to water is excessively low and the polymer is not sometimes dissolved in water.

The balance between the hydrophobic property and the hydrophilic property of the ionic polymer can be expressed by an acid value when the anionic polymer is used.

The acid value of the anionic polymer is preferably from 60 to 200 and, particularly preferably, from 70 to 130 since the electrodeposition property is improved.

If the acid value of the anionic polymer is less than 60, affinity to the aqueous solvent is lowered in which the anionic polymer is sometimes precipitated and the viscosity of the electrolyte increases excessively failing to form a uniform electrodeposition film. On the other hand, if the acid value exceeds 200, the waterproofness of the electrodeposition film formed is lowered, or the electrodeposition efficiency is lowered.

The molecular weight of the ionic molecule is preferably from $6.0 \times 10^3$ to $2.5 \times 10^4$ and, more preferably, $9.0 \times 10^3$ to $2.0 \times 10^4$ in the number average molecular weight in view of the film property of the electrodeposition film.

If the number average molecular weight is less than $6.0 \times 10^3$, the film is made not uniform to deteriorate the waterproofness and, as a result, cracks may be formed in the electrodeposition film or the electrodeposition film is turned into powder, failing to obtain an electrodeposition film of high fastness. On the other hand, if the molecular weight exceeds $2.5 \times 10^4$, the affinity with the aqueous solvent is lowered to cause precipitation, or the viscosity of the electrolyte increases excessively making the electrodeposition film not uniform.

Further, the ionic polymer preferably has a glass transition point of 100° C. or lower, a flow initiation point of 180° C. or lower and a decomposition point of 150° C. or higher, preferably, 220° C. or higher, since the film property of the electrodeposition film having the ionic polymer formed on the substrate is favorable and is less degraded due to the film deposition applied subsequently.

The colorant contained in the aqueous electrolyte can include colorants such as dyes and pigments and, among them, pigments are preferred since a film of a uniform thickness can be formed stably.

The pigment can include generally known pigments, for example, azo pigment, phthalocyanine pigment, quinacridone, perylene pigment and anthraquinone series pigment.

When a conductive colored film is formed, a conductive electrodeposition material or a conductive colorant containing a conductive material in the aqueous electrolyte is used.

The conductive material can include, for example, transparent conductive materials, transparent conductive polymeric compounds, salts and conductive colorants.

The transparent conductive material can include transparent conductive materials such as ITO and $SnO_2$, as well as a mixture thereof.

The salt can include those giving no effect on the electrodeposition characteristic, for example, inorganic salts such as NaCl, KCl, and $NH_4Cl$ and organic salts such as tetraethyl ammonium chloride or tetraethyl ammonium perchlorate.

There are various combinations of the salts and cation can include alkali metal ions, ammonium ions and quaternary ammonium salt, and anion can include, for example, halogen ion, sulfate ion, perchlorate ion, nitrate ion, sulfonate ion, $BF_4^-$ and $PF_4^-$ and, those ions less likely to suffer from oxidation/reduction to themselves are preferred and, further, ammonium salt, quaternary ammonium salts of halogen ion, nitrate ion, sulfate ion and sulfonate ions are more preferred in view of the water solubility.

On the other hand, it is better to avoid use of the alkali metal so as not to give undesired effect on a thin film transistor (TFT).

The conductive colorant can include carbon black in addition to the ionic colorant described above.

The aqueous electrolyte is used by dissolving or dispersing the electrodeposition material in an aqueous solvent. The aqueous solvent means a solvent having water as the main ingredient and optionally incorporated with other solvent having a hydrophilic property such as alcohols or various salts and additives within such a range as not deteriorating the effect of the present invention.

The content of the aqueous solvent (ingredient weight ratio) in the aqueous electrolyte preferably from 65 to 96% by weight based on the entire weight of the aqueous electrolyte.

After the colored film forming step for each color or the step of forming a black matrix to be described later, the substrate may be cleaned by a liquid with an aim of removing electrolyte used in each of the steps.

As the cleaning liquid to be used, a transparent inert liquid of high safety is preferred. However, since cleaning is applied just after the film deposition and the strength of the film formed is weak, a cleaning liquid capable of promoting hardening simultaneously with cleaning for removal is effective. Use of the cleaning liquid for promoting the solidification of the colored film is further preferred since the strength of the colored film is improved.

As the cleaning liquid described above, an aqueous solution controlled to such a pH value at which the contained electrodeposition material is deposited more easily than the deposition initiation pH value of the electrolyte. When the substrate formed with the colored film is cleaned by the pH-controlling liquid, the electrolyte deposited to the substrate used in the preceding step can be removed and the strength of the colored film can be improved. In such cleaning, fastness of the electrodeposition film is improved and, as a result, a color filter of high resolution power can be prepared, for example, by decreasing the pH value of the cleaning liquid to lower than the pH value for the initiation of deposition of the electrodeposition material in a case of using an electrodeposition material having cationic dissociation groups such as carboxyl groups and increasing the pH value of the cleaning liquid to higher than the pH value for the initiation of deposition of the electrodeposition material in a case of using an electrodeposition material having anionic dissociation groups such as amino groups.

For the pH range of the pH-controlling liquid, it is preferably set within a range of 1 or more and 2.5 or less relative to the deposition initiation pH value in the direction that the electrodeposition material is less deposited.

(Light source)

As the light source for the irradiation of light to a thin photosemiconductor film, known light sources can be used generally such as mercury lamp, mercury xenon lamp, He—Cd laser, gas laser, excimer laser, He—Ne laser, semiconductor laser and infrared laser.

Among them, a high pressure mercury lamp or a mercury xenon lamp of outputting deep UV is preferred.

Further, it is necessary that the irradiation light has a wavelength region of causing the thin photosemiconductor film to generate a photoelectromotive force. For example, photosemiconductors such as titanium dioxide and zinc oxide generate a photoelectromotive force under the irradiation of UV-rays. On the other hand, polysilicon, phthalocyanine series compound and the like generate a photoelectromotive force under the irradiation of infrared rays. As described above, a light source emitting a light for which the photosemiconductor to be used is sensitive may be selected properly.

The method of irradiating imagewise can include, for example, a method of entire exposure by using a mercury lamp, mercury xenon lamp or the like by way of a photomask and a method of scanning exposure by using a laser.

Conductive Layer Forming Step

In the conductive layer forming step, after the colored film forming step or the black matrix forming step to be described later, a transparent conductive layer is formed to the surface of an electrodeposition substrate on the side formed with the colored film so as to establish a current supply channel with the have the electronic circuit material. Generally, since the colored film is a highly insulative film, a conductive layer as an electrode for the liquid crystal display has to be disposed on the colored film.

In this case, conduction between the conductive film for forming the colored film or the electronic circuit material disposed on the substrate and the transparent electrode plate as an electrode for the liquid crystal display disposed on the colored film (current supply channel) is ensured by a known method such as a sputtering method, by removing a portion of the thin photosemiconductor film or the colored film and applying wiring in a recess in which the TFT or the conductive film is exposed or at the end of the layers laminated on the electrodeposition substrate. Further, the current supply channel can be ensured also by forming a colored film having a conductivity by using an aqueous electrolyte containing a conductive material and wiring the colored film with the TFT or the conductive film.

Figure 3D:
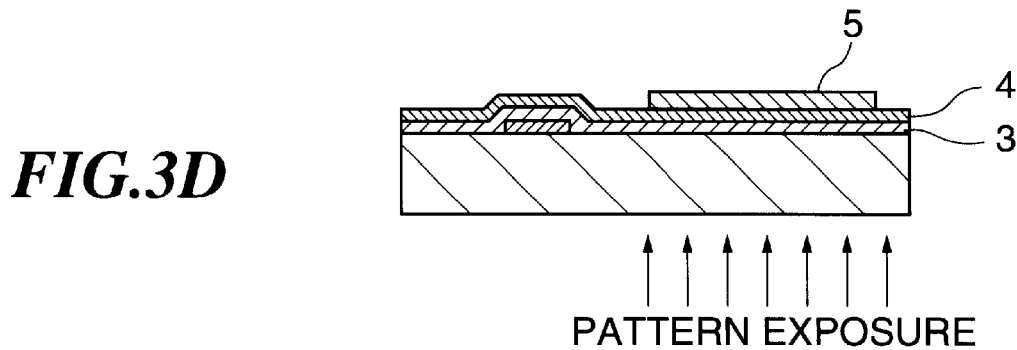
Figure 3E:
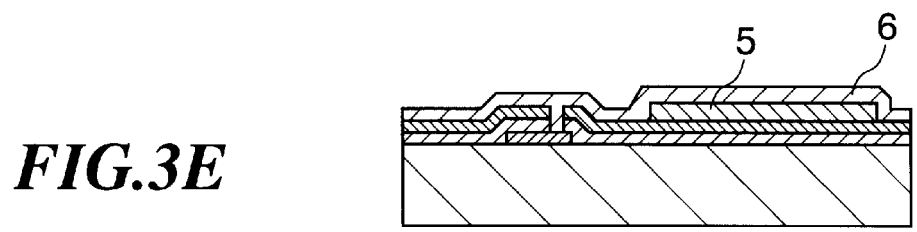
Figure 5B:
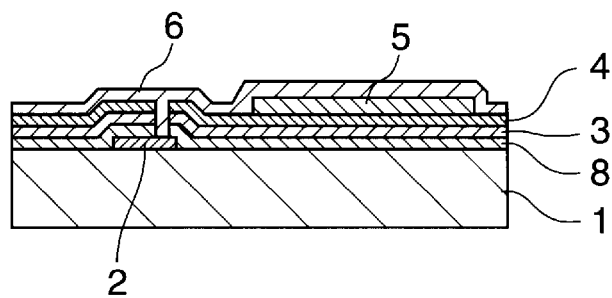
Figure 7B:
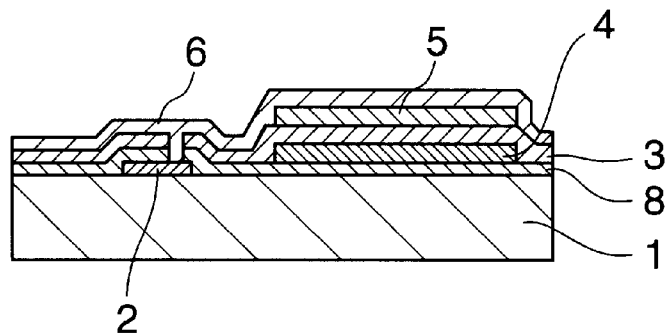

For example, as shown in FIG. 3E, after forming a colored film 5 on a thin photosemiconductor film 4, a transparent conductive layer 6 is laminated over the entire surface of an electrodeposition substrate. In this case, since it is necessary that the conductive layer 6 is electrically in conduction with an electronic circuit material 2, the conductive film 3 and the thin photosemiconductor film 4 in a region not formed with the colored film 5 are removed by a known method such as a sputtering method to form a recess before laminating the conductive layer 6 after the disposition of the colored film 5 and then the conductive layer 6 is formed so as to bury the recess. A current supply channel can be disposed in the same manner also in a structure in which an insulative film 8 is disposed between a substrate having the electronic circuit material 2 on a support 1, and a transparent conductive film 3 as shown in FIG. 5B or FIG. 7B. In a case where a liquid crystal display device is prepared by joining the electronic circuit material 2 and the conductive layer 6 as the electrode for controlling the liquid crystal material disposed on the conductive layer 6, it is possible to drive the liquid crystal molecules and display images by the control of the circuit material 2.

The conductive layer 6 can be provided by using the same material as that for the conductive film 3 formed in the electrodeposition substrate forming step described previously and by the same method.

The thickness of the conductive layer disposed in this state is preferably from 500 Å to 3 μm and, more preferably, from 1000 Å to 500 Å.

Heat Treating Step

In the heat treating step, the strength and the solvent resistance of the resultant film can be improved by applying a heat treatment to the film formed after the colored film forming step or the black matrix forming step to be described later. A radical former or an acid former may be added into the aqueous electrolyte with an aim of promoting the improvement for the film strength and the solvent resistance.

The heat treating step may be applied successively after forming the colored film of each color, or applied after forming colored films of three RGB colors and further, may be applied collectively after applying the black matrix. However, it is preferred to apply the film hardening step successively after forming the colored film of each color with a view point of sufficient improvement for the film property of each film. Further, when the black matrix is to be disposed precedently by an optical electrodeposition method, the step may be disposed after forming only the black matrix.

The heating method can include, for example, a method of heating while placing the product, for example, in an oven or vacuum heating equipment controlled to a desired temperature or a method of blowing a heating gas to the surface.

The heating temperature in the heat treating step is preferably from 50 to 250° C. and, more preferably, from 90 to 200° C.

If the heating temperature is lower than 50° C., no effective film strength and solvent resistance can be obtained. On the other hand, if it exceeds 250° C., it may sometimes exceed the heat resistant limit of other materials such as resins.

Further, the heating time may be set optionally depending on the heating temperature described above.

Figure 8:
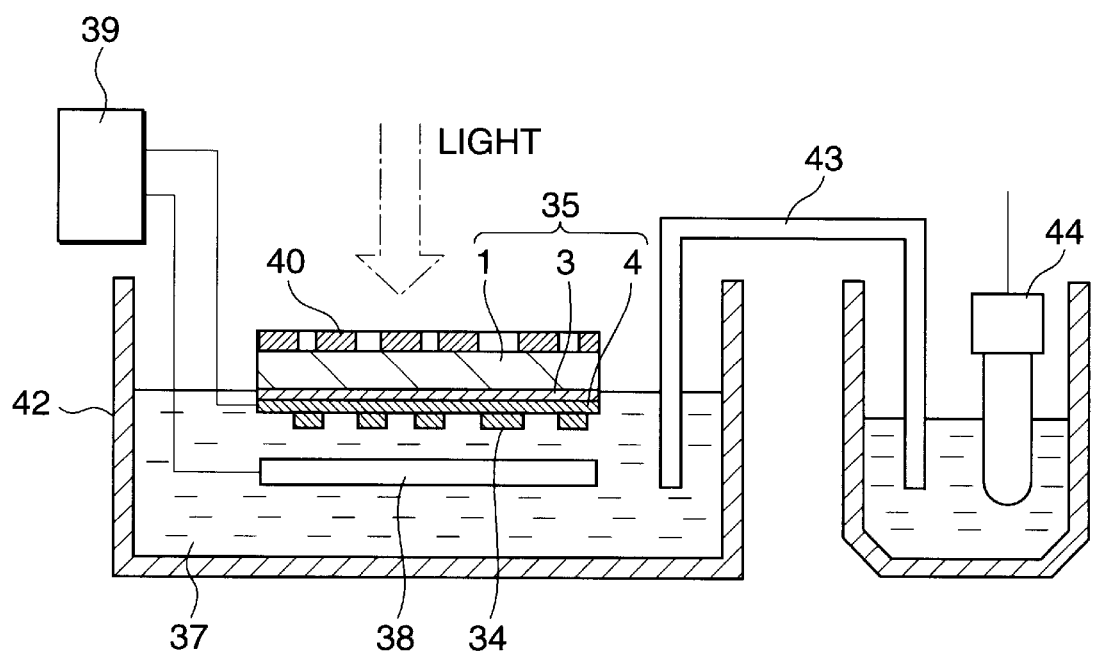
FIG. 8 is a model illustrating a schematic view showing an example of an apparatus for manufacturing a filter by an optical electrodeposition method.

The method of forming the colored film according to the present invention is to be explained briefly with reference to FIG. 8.

An electrodeposition substrate 35 having a conductive film 3 and a thin photosemiconductor film 4 laminated successively on a support 1, a counter electrode 38, a control electrode 43, and a control unit 44 for the control electrode are arranged as shown in FIG. 8. An electrolyte 37 is filled in an electrodeposition vessel 42, and the counter electrode 38 is disposed in the electrodeposition vessel and connected with a power source 39.

The electrodeposition substrate 35 is disposed to the electrodeposition vessel 42 such that at least the thin photosemiconductor film 4 is in contact with the electrolyte 37 and it is connected as a working electrode by way of the conductive film 3 to the power source 39. An electrodeposition material at least containing a colorant is dissolved or dispersed in the aqueous electrolyte 37.

Then, the substrate 35 is irradiated with a light by way of a photomask 40 while a bias voltage is applied from the power source 39 to the conductive film 3. A photoelectromotive force is generated in the irradiated area of the thin photosemiconductor film 4 and, when the potential for the thin photosemiconductor film 4 exceeds a threshold value for the electrodeposition material in the aqueous electrolyte by the resultant photoelectromotive force and the bias voltage, a colored film (a colored electrodeposition film) 34 is formed only in the irradiated area. A colored film having a desired image pattern (color filter film) 34 can be formed by the procedures described above while successively and alternately using three kinds of electrolytes containing colorants for R, G, B respectively.

When the electrodeposition substrate 35 formed with the colored film 34 is arranged again as shown in FIG. 8, the electrodeposition substrate 35 is brought into contact with an aqueous electrolyte in which an electrodeposition material containing a black colorant or metal is dissolved or dispersed and is irradiated with a light patternwise or entirely, a black electrodeposition film, that is, a black matrix is formed only in the region not formed with the colored film 34.

As described above, a colored film having a fine and complicate pixel pattern, with a high resolution power and excellent in surface smoothness can be formed directly at low cost by a simple and convenient step.

Black Matrix Forming Step

In the present invention, a step of forming a black matrix may also be provided.

In the black matrix forming step, a black colored film, that is, a black matrix may be formed selectively in the irradiated area by the same process as in the colored film forming step described above, by irradiating a light using an aqueous electrolyte containing a black colorant. It may be a step of forming a thin metal plating film using an aqueous electrolyte containing a metal-containing electrodeposition material.

In these cases described above, the black matrix can be formed simply and at a high fineness without using photolithography. The black matrix forming step may be applied before or after the colored film forming step. When the black matrix is formed before the colored film forming step, it is preferred to use an electronic circuit material already applied with an insulation treatment, or conduct the step after applying the insulation treatment described above.

The black matrix layer is required to have a function both for the light screening and light reflection preventive characteristics. Further, if the layer cannot be obtained as a thin film, formation of the fine pattern of the black matrix layer is difficult. That is, an excellent characteristic is attained by forming a thin film having two functions of high light permeability and absorbability for incident light with no reflection.

A black matrix layer capable of satisfying a high light shielding performance inherent to the thin metal film, high light absorbability inherent to the thin black pigment dispersed resin series film and, further and thin film formation can be formed as a black matrix layer of a layered structure in which a thin metal film and a black pigment dispersed thin resin film are composited (laminated).

Further, the black matrix may be formed also by coating a solution of a UV-ray curable resin containing a black colorant such as a black carbon powder on a colored film formed on the substrate, or bringing the substrate formed with the colored film into contact with the solution and applying UV-rays thereby forming a thin resin film containing a black colorant.

As described above, in a case of the method of using the aqueous electrolyte containing the black colorant, a known black colorant may be used properly as the black colorant, for which a conductive black colorant is preferred and, among all, carbon black is particularly preferred with a view point that the colored film can be formed so as to have an overlapped portion after forming the black matrix as described later.

In addition, the polymer material contained in the electrodeposition material is identical with the material used for the colored film forming step.

When a thin metal plating film is formed, a black matrix including a thin metal plating film can be formed by using an aqueous electrolyte containing a metal-containing electrodeposition material for the aqueous electrolyte and by the same process as the colored film forming step and the black matrix forming step using the aqueous electrolyte containing the black colorant.

In the upper layer in which the thin metal plating is deposited, since the resistance of the metal film is low, a generated current diffuses and an electrodeposition film is less likely to be laminated unnecessarily, which is preferred in that the layer thickness of the black matrix can be reduced.

When the thin metal plating film is formed before the colored film forming step, it is preferred that the thin metal plating film has durability to the aqueous electrolyte used in the colored film forming step. Accordingly, it is preferred to use an aqueous electrolyte containing highly durable metal for the thin metal plating layer and such metal can include, for example, Ni, Cr, Cu, Au, Ag, Mo, Sn, Zn, Co, Ti, Ta, Pb and Rr and it is preferred to use an aqueous electrolyte containing one or plural of metal ions selected from them. Among them, metal ions selected from Ni, Cr, Cu, Au, Ag, Mo, Sn, Zn and Co are particularly preferred in view of the thin film forming ability and the plating solution stability.

Since most of metals are deposited on the cathodic electrode, in a case of using an n-type photosemiconductor such as titanium oxide for the thin photosemiconductor film constituting the substrate, a bias is applied so as to make the substrate anodic in the colored film forming step, while the bias is applied so as to make the substrate cathodic in a case of forming the thin metal plating film.

When a black matrix is formed by using a solution of a UV-ray curable resin containing the black colorant described above, a black colorant is dispersed in a solution in which a UV-ray curable resin is dissolved in a solvent, which is deposited on the entire surface of a substrate on the side formed with the colored film, UV-rays are applied only to the region for forming the black matrix thereby curing the resin and, subsequently, the deposited material is dissolved by a solvent to remove the solution present in the uncured region.

When the colored film and the black matrix are formed on the substrate, it is preferred to form a black matrix or a colored film of a single color or plural colors by way of a photomask and then form a colored film of a single color or plural colors or a black matrix so that the black matrix and the colored film to overlap each other.

That is, when the colored film is formed after forming the black matrix, a light is applied as far as the region for the black matrix, thereby forming a colored film also on the light irradiated black matrix so as to form a region overlapped with the black matrix. It is identical also in a case of forming the black matrix after forming the colored film.

It is preferred to form a conductive protection layer applied with an orientation treatment on the colored film and the black matrix formed on the substrate as described above.

Further, the orientation treatment can also be applied by a known method such as rubbing on the surface of the protection film.

<Driving Device>

The driving device according to the present invention is provided with the following embodiment (first and second embodiments).

The first embodiment includes, on a transparent support, an electronic circuit material, a transparent conductive film connected with the electronic circuit material, a transparent thin photosemiconductor film having a photovoltaic function covering at least the conductive layer, and a colored film formed on the thin photosemiconductor film. The electronic circuit material is as has been described previously. Further, the second embodiment includes, on a transparent support, plural thin film transistors arranged orderly as the electronic circuit material, a first common electrode for connecting gate electrodes constituting thin film transistors in common, a second common electrode for connecting source electrodes constituting thin film transistors in common, a transparent conductive film connected with drain electrodes constituting each of the thin film transistors, a transparent thin photosemiconductor film having a photovoltaic function at least covering the conductive film and a colored film formed on the thin photosemiconductor film.

The constitution for the driving device according to the present invention is determined depending on the constitution of the substrate and the constitution of the conductive film and the thin photosemiconductor film to be formed but there is no other particular restrictions and it may be a constitution shown, for example, in FIG. 3D and FIG. 3E, FIG. 4D and FIG. 4E, FIG. 5B and FIG. 7B, in which electronic circuit material (active element) is disposed in the first or second embodiment. The substrate may be of any constitution, and can be properly selected from commercially available substrates or selected properly from the substrates as described previously.

The driving device of the first embodiment is a driving device with a colored film in which a conductive film and a thin photosemiconductor film are laminated in this order on a substrate having an active element with a source electrode, a drain electrode and a gate electrode, the conductive film is electrically connected with the drain electrode and, further, a colored film is electrodeposited on the thin photosemiconductor film to be in contact with the electrolyte by the method of forming the colored film according to the present invention as described previously.

The driving device of the second embodiment is a driving device with a colored film in which thin film transistors as the active element each having a source electrode, a drain electrode and a gate electrode are arranged in a two-dimensional matrix together with the conductive film adjacent with the thin film transistors and, further, the gate electrodes are connected with the first common electrode, the source electrodes are connected with the second common electrode and the drain electrodes are connected with the conductive film and, further, a colored film is electrode-posited on the thin photosemiconductor film to be in contact with the electrolyte by the method of forming the colored film according to the present invention as described previously.

The gate electrode is provided to each of the display devices (pixels) having the conductive film and the active element and, actually, it serves as a portion of the first common electrode for communication between each of the adjacent display devices.

In a preferred embodiment, a transparent conductive layer is further disposed on the colored film as an individual electrode corresponding to the colored film disposed to each of the devices (pixels) and a conductive layer 6 can be disposed, for example, as shown in FIG. 3E, FIG. 4E, FIG. 5B and FIG. 7B. The conductive layer gives an electric field relative to a transparent electrode plate disposed by way of a liquid crystal material to enable image display by the control of the liquid crystal molecules.

As described above, a driving device having a colored film of high resolution power and excellent in pattern accuracy can be obtained at low cost by forming a colored film by an optical electrodeposition method using a substrate having an active element.

<Liquid Crystal Display Device>

Figure 9:
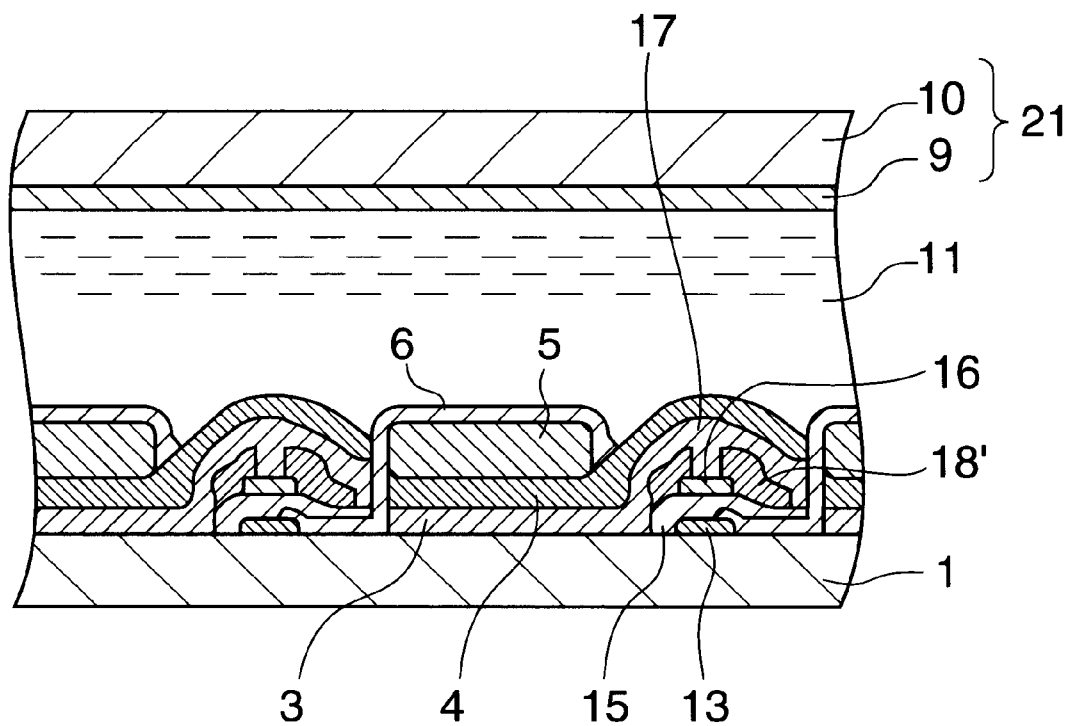
FIG. 9 is a schematic cross sectional view showing an example of a liquid crystal device according to the present invention.

The liquid crystal display device according to the present invention includes the driving device of the present invention described above, a transparent conductive plate opposed to the surface of the driving device on the side formed with the colored film, and a liquid crystal material disposed being put between the driving device and the transparent conductive plate and, for example, it may be of a constitution shown in FIG. 9 (embodiment including the driving device of the second embodiment).

FIG. 9 is a schematic cross sectional view for explaining an example of a liquid crystal display device according to the present invention.

In the liquid crystal display device of this embodiment, a liquid crystal material 11 is put between two supports, that is, a first common support 10 and a second glass common support 1.

A transparent electrode 9 is a single common electrode formed on the first support 10, and the transparent electrode 9 and the support 10 constitute a transparent conductive plate 21. A conductive film 3 is formed so as to cover also the active element on the support 1, and a thin photosemiconductor film 4 is laminated further on the conductive film 3. A colored film 5 is formed to a region on the thin photosemiconductor film 4 corresponding to each of the display devices (pixels) by the optical electrodeposition method described previously.

Another conductive layer 6 opposed to the transparent electrode 9 as the common electrode and disposed with the liquid crystal material 11 being put therebetween is an individual electrode corresponding to each of the display elements (pixels) covering the colored film and connected with gate electrodes 13 arranged in a matrix by way of a through hole structure.

The conductive film 3 is connected with a drain electrode 17 constituting the active element corresponding to each pixel.

The source electrode and the gate electrode constituting each of the active elements are disposed in a two-dimensional manner, that is, as a matrix on a glass support 1 as shown in FIG. 6, and each of the active elements is constituted, as shown in FIG. 9, with a gate electrode 13, an insulative film 15 formed on the gate electrode 13, a semiconductor 16, a source electrode 18' and a drain electrode 17. When current is supplied to the source electrode 18 and the gate electrode 13 in the matrix and rendered active, the corresponding drain electrode 17 is selectively switched ON.

In the liquid crystal display device according to the present invention, a colored film (filter film) 5 is formed selectively in a region irradiated with a light upon electrodeposition on a thin photosemiconductor film 4 covering the active element. In a case of a full color liquid crystal display device, colored films each for red (R), green (G) and blue (B) are formed with the thin photosemiconductor fills respectively situating at adjacent three display elements (pixels) to constitute a display unit with three RGB pixels.

Further, a conductive layer 6 is disposed to each of the thus formed colored films 5, and the liquid crystal material 11 in the display device region with voltage being applied between both of the electrodes for the conductive layer 6 and the transparent electrode 9 is modulated by the electric field caused between both of the electrodes and, as a result, a light transmitting therethrough is controlled to display desired images.

The colored film 5 is formed directly by the method of forming the colored film according to the present invention and the colored film 5 serves as a color filter film.

Since the conductive layer for applying the driving voltage is disposed on the individual colored film of each of the pixels, a transmission light corresponding to the area equal with the projection area relative to the first support of the liquid crystal material oriented corresponding to the area of the conductive layer situated to each of the pixels is colored and displayed.

The liquid crystal display device according to the present invention can be fabricated, for example, as described below.

At first, as shown in FIG. 3C, a thin film transistor (TFT) 2 is disposed as the active element described above on a support 1. In this step, the support 1 having TFT 2 arranged in a matrix is masked electrically. The mask is provided for preventing TFT corresponding to each of the pixels from short-circuiting each of electrodes or semiconductor constituting each TFT from being oxidized in contact with water when the support 1 is brought into contact with or immersed in an electrolyte when current is supplied to the gate electrode 13 and the source electrode 18' in the colored film forming step. Also in this case, the source electrode 18 and the gate electrode 13 to which each TFT is connected in each pixel also extend as far as the end of the support 1 being insulated against contact with water, and connected with TFT driving IC (driving IC) integrated preferably with the support at the end or the outside of the support 1.

Then, a conductive film 3 a the thin photosemiconductor film 4 are laminated in this order so as to cover the TFT 2, to obtain an electrodeposition substrate.

The driving IC may be a thin film IC formed integrally on the support 1 in the thin film forming process. In this case, the thin film IC is connected with a power source at the outside of the support 1. Further, the driving IC may be mounted separately to the end of the support 1, or may be a driving IC chip connected with the source electrode line 6 and the gate electrode 2 disposed outside of the support 1.

The electrodeposition substrate is used and a colored film (color filter film) 5 can be formed on the thin photosemiconductor film 4 thereof as shown below.

As shown in FIG. 8, an electrolyte vessel 42 containing an aqueous electrolyte 37 corresponding to a desired hue is provided, and a counter electrode 38 connected with a power source 39 is disposed in the aqueous electrode 37 of the electrolyte vessel 42. A potentiostat or the like can be utilized for the power source 39.

The electrodeposition substrate 35 is disposed such that at least the thin photosemiconductor film is in contact with or immersed in the aqueous electrolyte 37 so as to form the colored film on the thin photosemiconductor film. When a light is applied form a light source disposed above the substrate on the side not formed with the thin photosemiconductor film by way of a photomask 40, a photoelectromotive force is generated selectively only in the irradiated area on the thin photosemiconductor film, and pH change is caused at the surface of the thin photosemiconductor film, by which the electrodeposition material in the electrolyte 37 is deposited selectively to form a colored film on the light-irradiated thin photosemiconductor film.

Since the film is formed by deposition utilizing the pH change, a colored film of uniform thickness and excellent surface smoothness can be formed and a fill color filter film can be formed directly on the substrate having the TFT by repeating the identical procedures using an aqueous electrolyte corresponding to each of the colors. The liquid crystal display device according to the present invention can be obtained by combining the liquid crystal material and the transparent conductive plate therewith.

As has been described above, since the colored film of high resolution power, with uniform thickness and excellent in surface smoothness is formed directly on a substrate having an active element, a liquid crystal display device of high resolution power can be obtained at low cost on a substrate having an active element such as a thin film transistor (TFT), without combination of color filters prepared separately.

In a case where a filter is intended to be formed on pixel electrodes (liquid crystal driving electrodes) corresponding to the TFrs, respectively, arranged in a matrix by only utilizing the driving voltage of TFT, have to be driven to scan gate lines and source lines have to be scanned successively under driving by driving each of gate lines and source lines G1–S1 and G4–S1 and then $G_2$–S2, G5–S2 in a state of bringing a TFT substrate into contact with a red electrodeposition solution, for example, as shown in FIG. 10A. In such a case, since the red filter for the G1–S1 part formed previously is left in the electrodeposition solution in a non-current-supplied state till the electrodeposition step has been completed for all of the filters, there is a problem that the film quality is deteriorated by re-dissolution of the film. Further, there is also a drawback that the time of forming the filter is increased. In the drawing, R represents a red filter, B represents a blue filter and G represents a green filter. Otherwise, a needle electrode has to be in contact with individual pixel electrode, for instance, as described in Japanese Published Unexamined Patent Application No. Sho 63-21622 as an instrument for applying electric energy other than TFr driving voltage, but this is not easy. Alternatively, it is enforced to select a method of disposing RGB filters in a longitudinal direction on every color as shown in FIG. 10B, which results in a drawback of displaying structure lines. In the present invention, since a semiconductor film having a photoelectromotive force generating ability is disposed on a substrate on the side of TFT, particularly, on a pixel electrode and the film is formed by the photoelectromotive force, filters of respective colors can be formed collectively by the irradiation of the light only for once in the electrodeposition solution of each color and there is no problem of re-dissolution, and there is also provided an effect free from the restriction on the direction of arranging the filters. Furthermore, since a photosemiconductor film is covered on the surface of the substrate formed with the TFT upon formation of the electroconductive film, it can also provide an effect of protecting the TFT upon forming the electrodeposition film.

EXAMPLE

The present invention is to be explained by way of examples but the invention is not restricted only to such examples. In the examples, "%" always means "% by weight".

Example 1

Electrodeposition Substrate Forming Step

A thin film transistor (TFT) was disposed on one surface of an alkaliless glass support of 0.9 mm in thickness and a transparent conductive film made of a ITO (thin ITO film) of 0.1 $\mu$m in thickness was formed by a sputtering method on the identical surface of the substrate adjacent with the drain electrode constituting TFT in a region not formed with the TFT to prepare a substrate having an identical cross sectional structure with that shown in FIG. 4B. The TFT 2 and the thin ITO film 3 are connected by way of a conduction channel 7, that is, a drain electrode constituting the TFT 2. Then, a $TiO_2$ film (thin $TiO_2$ film) of 0.2 $\mu$m in thickness was formed by a sputtering method on the entire surface of the glass support 1 so as to cover the TFT 2 and the thin ITO film 3 to obtain an electrodeposition substrate of a structure shown in FIG. 4C.

For improving the current characteristic of the thin $TiO_2$ film on the electrodeposition substrate 35, it was annealed in a pure nitrogen gas mixed with a 3% hydrogen gas at 280° C. for 20 minutes to apply a reducing treatment.

Colored Film Forming Step

The electrodeposition substrate obtained as described above was used as an electrodeposition substrate 35 in FIG. 8 and a colored film (color filter film) can be formed on the $TiO_2$ film. An apparatus having a three-electrode system customarily used in the field of electrochemistry having the same structure as that in FIG. 8 was provided.

Further, an aqueous electrolyte 37 prepared as described below was provided for the electrodeposition vessel 42.

As the aqueous electrolyte 37, a copolymer of styrene-acrylic acid-acrylate (number average molecular weight: 16000, molar ratio for hydrophobic group/(hydrophilic group+hydrophobic group): 70%, acid value: 120) and a fine anthraquinone series red particulate pigment (average grain size: 23 nm) at a solid weight ratio of 5.5 were dispersed and mixed in 100 g of pure water to prepare an aqueous electrolyte (pH: 7.9, volume resistivity: $2 \times 10^2$ $\Omega \cdot cm$).

As shown in FIG. 8, the electrodeposition substrate obtained as above was disposed so as to be in contact with the aqueous electrolyte 37 and a voltage was applied to the ITO conductive film using the thin photosemiconductor film ($TiO_2$ film) as a working electrode such that the bias potential difference on the working electrode was +1.7 V relative to the saturated calomel electrode. Further, a light was applied for three seconds at the back of the electrodeposition substrate (surface of the support of the electrodeposition substrate on the side not disposed with the thin photosemiconductor film) from a mercury xenon lamp (manufactured by YAMASHITA DENSO CORPORATION; wavelength: 365 nm, light intensity: 50 mW/cm$^2$) through a photomask for a red filter (refer to FIG. 8 and FIG. 4D). A transmission light was applied on the surface of $TiO_2$ and a red pattern, that is, a red colored film (red filter film) of uniform 1.2 $\mu$m in thickness was formed only in the irradiated region. Subsequently, cascade cleaning was conducted thoroughly using a pH-controlling liquid at pH 5.5.

The optical transmission density measured for a minor area portion of the red colored film was 1.2.

Then, a copolymer of styrene-acrylic acid-acrylate and ultrafine a phthalocyanine green series particulate pigment (average grain size: 30 nm) at a solid weight ratio of 5.5 were dispersed and mixed in 100 g of pure water to prepare an aqueous electrolyte (PH: 7.9, volume resistivity: 8×10 $\Omega$·cm).

Figure 4D:
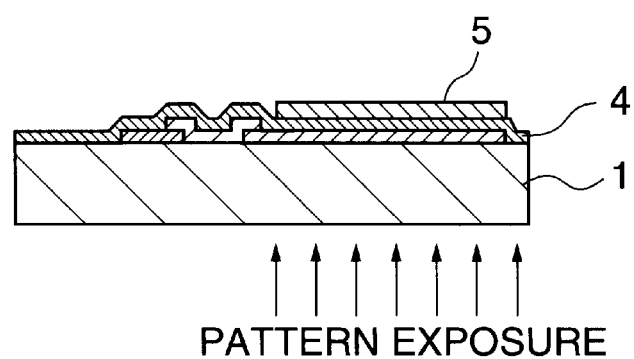
Figure 4E:
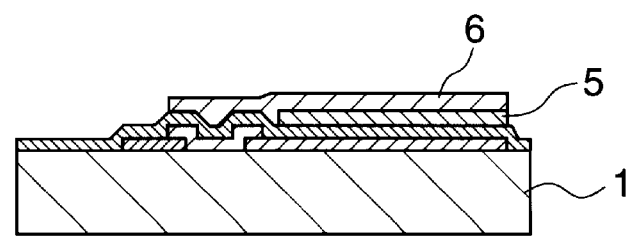

When the aqueous electrolyte 37 was replaced with the thus obtained aqueous electrolyte and a light was applied through a photomask for a green filter like that in the case of forming the red colored film, a green colored film (green filter film) was formed only in the light irradiated region on the surface of $TiO_2$ as shown in FIG. 4D. Subsequently, unnecessary aqueous electrolyte deposited on the electrodeposition substrate was removed by cleaning using cleaning water at pH 6.0.

The optical transmission density measured for a minor area portion of the green colored film was 1.1 and the film thickness was 1.0 $\mu$m.

Further, a copolymer of styrene-acrylic acid-acrylate and ultrafine a phthalocyanine blue series particulate pigment (average grain size: 31 nm) at a solid weight ratio of 5.5 were dispersed and mixed in 100 g of pure water to prepare an aqueous electrolyte (PH: 7.8, volume resistivity: 4×10 $\Omega$·cm).

After setting the bias potential difference on the working electrode at 1.8 V and replacing the aqueous electrolyte 37 with the thus obtained aqueous electrolyte, when a light was applied through a photomask for a blue filter like that in a case of forming the red colored film, a blue colored film (blue filter film) was formed only in the light irradiated region on the surface of $TiO_2$ as shown in FIG. 4D. Subsequently, unnecessary aqueous electrolyte deposited on the electrodeposition substrate was removed by cleaning using cleaning water at pH 6.0.

The optical transmission density measured for a minor area portion of the blue colored film was 1.1 and the film thickness was 1.0 $\mu$m.

Heat Treating Step

Then, an electrodeposition substrate 35 formed with a colored film 5 for three B, G, R colors was placed in an oven at a temperature of 230° C. and applied with a heat treatment for 30 minutes to cure the colored film.

Conductive Layer Forming Step

Subsequently, a thin ITO film (film thickness: 0.08 $\mu$m) was formed on the entire surface of the electrodeposition substrate 35 formed with the colored film 5 by a sputtering method and the thin ITO film other than the portion for the colored film 5 and the thin photosemiconductor film 4 was removed by providing a photolithographic step, to form a conductive layer, that is, a display electrode portion capable of controlling liquid crystal molecules when combined with a liquid crystal material on the colored film 5 and a portion of the thin photosemiconductor film 4. The display electrode portion was joined with the electrode for TFT. disposed in the lower layer to obtain a driving device of the present invention having the same cross sectional structure as in FIG. 4E.

<Fabrication of a Liquid Crystal Display Device>

A transparent conductive plate formed with an ITO film on the entire surface of another glass support (opposing substrate) was prepared and the surface of the ITO film of the transparent conductive plate and the surface of the driving device obtained as described above on the side formed with the colored were arranged by way of resin ball spacers so as to be opposed to each other with a predetermined gap width and they were secured. After charging a nematic liquid crystal material into the gap, it was tightly closed to obtain a liquid crystal display device according to the present invention.

As described above, a colored film could be formed directly on a substrate having the electronic circuit material and the colored film (color filter) could be formed with a simple and convenient step at low cost. The colored film thus obtained was of high resolution power and excellent in surface smoothness. Further, a driving device having a colored film of high resolution power and excellent in the surface smoothness could be obtained at low cost without combining a TFT, driving substrate and a color filter fabricated separately. By the provision of the thus obtained driving device, a liquid crystal display device having a pixel pattern of high resolution power could be obtained at low cost.

Example 2

Electrodeposition Substrate Forming Step

A thin film transistor (TTF) was disposed on one surface of an alkaliless glass support of 0.7 mm in thickness, and an $SiO_2$ film was deposited by a radio frequency sputtering method on the entire surface of the support on the side disposed with the TFT to form an insulative layer of 0.3 $\mu$m in thickness. Then, a transparent conductive ITO film (thin ITO film) of 0.07 $\mu$m in thickness patterned by a sputtering method was deposited on the insulative layer and wired with the electrode portion constituting the TFT. Further, after laminating a thin $TiO_2$ film of 0.2 $\mu$m in thickness by an ion plating method over the entire insulative layer and the thin ITO film, a hydrogen reducing treatment was applied at a temperature of 300° C. for improving the current characteristic of the thin $TiO_2$ film to fabricate an electrodeposition substrate of the same cross sectional structure as in FIG. 7A.

Colored Film Forming Step

An electrodeposition substrate obtained as above was used as the electrodeposition substrate 35 in FIG. 8, an apparatus having a three-electrode system customarily used in the electrochemistry field having the same structure as in FIG. 8 was provided, and an aqueous electrolyte 37 prepared as described below was provided for an electrodeposition vessel 42.

As the aqueous electrolyte 37, a styrene-acrylic acid random copolymer (number average molecular weight: 14,000, hydrophobic group/hydrophilic group+hydrophobic group) molar ratio: 73%, acid value: 90, glass transition point: 45° C., flow initiation point: 90° C., decomposition point: 247° C. and deposition initiation point pH: 5.8) and a fine azo series red particulate pigment (average grain size: 33 nm) were dispersed and mixed at a 5:5 solid weight ratio in 100 g of pure water and, subsequently, methylamino ethanol was added at a ratio of 210 mmol/L in the liquid dispersion to prepared an electrolyte at pH 7.9 (volume resistivity: 1×10² Ω·cm).

As shown in FIG. 8, the thus obtained electrodeposition substrate was arranged so as to be in contact with the aqueous electrolyte 37 and a voltage was applied to an ITO conductive film using the thin photosemiconductor film (TiO₂ film) as a working electrode such that the bias potential difference on the working electrode was +1.7 V relative to the saturation calomel electrode. Further, a light was applied for four seconds at the back of the electrodeposition substrate (on the support surface of the electrodeposition substrate on the side not formed with the thin photosemiconductor film) through a photomask for a red filter by a mercury xenon lamp (manufactured by YAMASHITA DENSO CORPORATION: wavelength: 365 nm, light intensity: 50 mW/cm²). A transmission light was applied to the TiO₂ surface to form a red pattern, that is, a red colored film (red filter film) of uniform 1 μm in thickness only in the irradiated region. Subsequently, it was thoroughly cascade-cleaned with a pH-controlling liquid at pH 4.9.

The optical transmission density measured for a minor area portion of the red colored film was 1.6.

Then, the same styrene-acrylic acid random copolymer as described above and a fine phthalocyanine green series particulate pigment (average grain size: 30 nm) were dispersed and mixed at a 5:5 solid weight ratio in 100 g of pure water and, subsequently, methylamino ethanol was added at a ratio of 200 mmol/L in the liquid dispersion to prepare an electrolyte at pH 7.9 (volume resistivity: 3×10² Ω·cm).

When the aqueous electrolyte 37 was replaced with the thus obtained aqueous electrolyte and a light was applied through a photomask for a green filter like that in the case of forming the red colored film, a green colored film was formed only in the light irradiated region on the TiO₂ surface. Subsequently, it was thoroughly cleaned with a pH-controlling liquid at pH 4.8.

The optical transmission density measured for a minor area portion of the green colored film was 1.4 and the film thickness was 1.0 μm.

Further, the same styrene-acrylic acid random copolymer as described above and a fine phthalocyanine blue series particulate pigment (average grain size: 31 nm) were dispersed and mixed at a 5:5 solid weight ratio in 100 g of pure water and, subsequently, methylamino ethanol was added at a ratio of 190 mmol/L in the liquid dispersion to prepare an electrolyte at pH 7.9 (volume resistivity: 8×10 Ω·cm).

After setting the bias potential difference on the working electrode to 1.8 V and replacing the aqueous electrolyte 37 with the thus obtained aqueous electrolyte, a light was irradiated through a photomask for a blue filter like that in the case of forming the red colored film, a blue colored film was formed only in the light irradiated region on the TiO₂ surface. Subsequently, it was thoroughly cleaned with a pH-controlling liquid at pH 4.8.

The optical transmission density measured for a minor area portion of the blue colored film was 1.6 and the film thickness was 1.0 μm.

Black Matrix Forming Step

Then, after dipping and coating the substrate formed with the colored film of three colors obtained as described above in a liquid dispersion formed by ultrasonic dispersion of a compound of the following composition and further applying pattern exposure on the taken out substrate, an alkli development was applied to remove a liquid dispersion in an unexposed area, to form a black matrix of 0.6 μm in the conductive portion not formed with the colored film. The black matrix had a function also as a protection layer.

The optical transmission density measured for a minor area portion of the black matrix was 2.2.

Composition for the Liquid Dispersion

The following content shows the content based on the entire weight of the liquid dispersion (wt %)

| | |
|---|---|
| Carbon black pigment particles having carboxyl groups on the particle surface (average grain size: 13 nm) | 5% |
| Light sensitive polymeric material (naphtoquinone diazo compound) | 0.8% |
| Cresol novolac resin | 4.0% |
| Alkyl ether acetate | 90.2% |

Heat Treating Step

Then, the substrate formed with the colored film of three colors BGR and the black matrix was placed in an oven at a temperature of 220° C. and heated for one hour to apply a treatment for hardening the film.

Conductive Layer Forming Step

Further, a portion of the conductive film 3 and the insulative layer 8 was removed by a photolithographic method, an ITO conductive layer (0.12 μm in thickness) was formed to the surface of the electrodeposition substrate on the side formed with the colored film or the black matrix by a sputtering method so as to be in electrical connection with the thin ITO film wired with the electrode portion for the TFT in the removed portion and, further, the conductive layer in a region except for the portion on each of the colored layers was removed by photolithography to electrically isolate the conductive layers on each of the colored films and obtain a driving device according to the present invention having the same the cross sectional structure as in FIG. 7B.

<Fabrication of a Liquid Crystal Display Device>

A transparent conductive plate formed with an ITO film on the entire surface of another glass support (opposing substrate) was prepared and the surface of the ITO film of the transparent conductive plate and the surface of the driving device obtained as described above on the side formed with the colored were arranged by way of resin ball spacers so as to be opposed to each other with a predetermined gap width and they were secured. After charging a nematic liquid crystal material into the gap, it was tightly closed to obtain a liquid crystal display device according to the present invention.

As described above, the colored film could be formed directly on the substrate having the electronic circuit material and the colored film (color filter) could be formed with a simple and convenient step at low cost. The colored film thus obtained was of high resolution power and excellent in the surface smoothness. Further, a driving device having the colored film of high resolution power and excellent in surface smoothness and a liquid crystal display device having a pixel pattern of high resolution power could be obtained at low cost without combining a TFT driving substrate and a color filter fabricated separately.

Example 3

Electrodeposition Substrate Forming Step

An alkaliless glass support of 0.5 mm in thickness was prepared and, as shown in FIG. 3A to FIG. 3E, a thin film transistor (TTF) 2 was disposed on one surface of the support 1, a transparent IT0 conductive film (thin ITO film) 3 of 0.1 μm in thickness was formed over the entire surface of the support 1 so as to cover the TFT 2 by a sputtering method and, further, a $TiO_2$ film 4 of 0.1 μm in thickness (thin $TiO_2$ film) was formed further on the film by an electron beam vacuum deposition method to prepare an electrodeposition substrate of the same cross sectional structure as in FIG. 3C.

For improving the current characteristic of the thin $TiO_2$ film of the electrodeposition substrate 35, it was annealed in a pure nitrogen gas mixed with a 3% hydrogen gas at 300° C. for five minutes to apply a reducing treatment.

Black Matrix Forming Step

The electrodeposition substrate obtained as described above was used as the electrodeposition substrate 35 in FIG. 8, and an apparatus having a three-electrode system customarily used in the field of electrochemistry having the same structure as in FIG. 8 capable of forming a colored film (color filter film) on the $TiO_2$ film was provided.

Further, an aqueous electrolyte 37 was provided for the electrodeposition vessel 42.

As the aqueous electrolyte 37, a styrene-acrylic acid random copolymer (number average molecular weight: 22,000, hydrophobic group/hydrophilic group+hydrophobic group) molar ratio: 72%, acid value: 103, glass transition point: 75° C., flow initiation point: 91° C., decomposition point: 264° C. and deposition initiation point pH: 6.1) and a fine carbon black particulate pigment (average grain size: 29 nm, oil absorption (DPB): 150 cc/100 g, pH: 3.5) were dispersed and mixed at a 3:7 solid weight ratio in 100 g of pure water to prepare an electrolyte at a 6% solid concentration (pH: 7.9, volume resistivity: $2\times10$ Ω·cm).

As shown in FIG. 8, the electrodeposition substrate thus obtained was arranged so as to be in contact with the aqueous electrolyte 37 and a voltage was applied to the ITO conductive film using the thin photosemiconductor film ($TiO_2$ film) as a working electrode such that the bias potential difference on the working electrode was +1.7 V relative to the saturation calomel electrode. Further, a light was applied for two seconds at the back of the electrodeposition substrate (on the support surface of the electrodeposition substrate on the side not formed with the thin photosemiconductor film) through a photomask for a red filter by a mercury xenon lamp (manufactured by YAMASHITA DENSO CORPORATION: wavelength: 365 nm, light intensity: 50 mW/cm$^2$). A transmission light was applied to the $TiO_2$ surface to form a black pattern, that is, a black matrix of uniform 0.9 μm in thickness only in the irradiated region. Subsequently, it was thoroughly cascade-cleaned with a pH-controlling liquid at pH 4.5.

The optical transmission density measured for a minor area portion of the black colored film was 2.6.

Colored Film Forming Step

Then, as the aqueous electrolyte 37 for forming the colored film, a styrene-acrylic acid random copolymer (number average molecular weight: 14,000, hydrophobic group/hydrophilic group+hydrophobic group) molar ratio: 67%, acid value: 89, glass transition point: 62° C., flow initiation point: 97° C., decomposition point: 238° C. and deposition initiation point pH: 6.3), a fine azo series red particulate pigment (average grain size: 41 nm) and a transparent conductive powder (ITO powder) were dispersed and mixed at a 6:4:4 solid weight ratio in 100 g of pure water to prepare an electrolyte at a 6% solid concentration (pH: 7.7, volume resistivity: $1.2\times10$ Ω·cm).

After setting the bias potential difference on the working electrode to 1.8 V and replacing the aqueous electrolyte 37 with the aqueous electrolyte thus obtained, a light was applied for six seconds at the back of the electrodeposition substrate (the support surface of the electrodeposition substrate on the side not formed with the thin photosemiconductor film) through a photomask for a red filter by a mercury xenon lamp (manufactured by YAMASHITA DENSO CORPORATION: wavelength 365 nm: light intensity 50 mW/cm$^2$). A transmission light was applied to the $TiO_2$ surface to form a red pattern, that is, a conductive red colored film (red filter film) of uniform 0.9 μm in thickness only in the irradiated region as shown in FIG. 3D. Subsequently, it was thoroughly cascade- cleaned with a pH-controlling liquid at pH 4.9.

The optical transmission density measured for a minor area portion of the red colored film was 1.5. Further, the volume resistivity of the red colored film was $3\times10^0$ Ω·cm.

Then, the same styrene-acrylic acid random copolymer as described above, a fine phthalocyanine green series particulate pigment (average grain size: 30 nm) and a transparent conductive powder (fine tin oxide powder) were dispersed and mixed at a 6:4:4 solid weight ratio in 100 g of pure water to prepare an aqueous electrolyte at 6% solid content (pH: 7.8, volume resistivity: $3\times10$ Ω·cm).

When the aqueous electrolyte 37 was replaced with the aqueous electrolyte thus obtained and a light was applied through a photomask for a green filter like that in the case of forming the red colored film, a conductive green colored film was formed only in the light irradiated region on the $TiO_2$ surface as shown in FIG. 3D. Subsequently, it was thoroughly cleaned with a pH-controlling liquid at pH 4.7.

The optical transmission density measured for a minor area portion of the green colored film was 1.53 and the film thickness was 1.2 μm. Further, the volume resistivity of the blue colored film was $5\times10^0$ Ω·cm.

Further, the same styrene-acrylic acid random copolymer and a ultrafine phthalocyanine blue series particulate pigment (average grain size 31 nm) as described above and a transparent conductive powder (fine ITO powder) were dispersed and mixed at a solid ratio 6:4:4 in 100 g of pure water to prepare an aqueous electrolyte at 6 wt % solid content (pH: 7.8, volume resistivity: $2\times10$ Ω·cm).

After setting the bias potential difference on the working electrode to 1.8 V and replacing the aqueous electrolyte 37 with the thus obtained aqueous electrolyte, when a light was applied through a photomask for a blue filter in the same manner as in the case of forming the red colored filter, a conductive blue colored film was formed only in the light irradiated region on the $TiO_2$ surface as shown in FIGS. 3–(4). Subsequently, it was thoroughly cascade-cleaned with a pH-controlling liquid at pH 4.2.

The optical transmission density measured for a minor area portion of the blue colored film was 1.61 and the film thickness was 1.0 μm. Further, the volume resistivity of the blue colored film was $9\times10^0$ Ω·cm.

After forming the colored film of each color, each of conductive colored films was wired with the electrode constituting the TFT 2 by way of a through hole structure by laminating the conductive layer 6 as shown in FIG. 3E.

Heat Treating Step

Then, the electrodeposition substrate formed with the black matrix and the colored film of three colors BGR was placed in an oven at a temperature of 220° C. and heat treated for 30 minutes to cure the colored film to obtain the same cross sectional structure as in FIG. 3D and, further, a polarization film was coated on the colored film of each color to obtain a driving device according to the present invention. Since the colored film itself was provided with electroconductivity, no additional conductive layer was disposed on each of the colored films.

<Fabrication of a Liquid Crystal Display Device>

A transparent conductive plate formed with an ITO film on the entire surface of another glass support (opposing substrate) was prepared and the surface of the ITO film of the transparent conductive plate and the surface of the driving device obtained as described above on the side formed with the colored film were arranged by way of resin ball spacers so as to be opposed to each other with a predetermined gap width and they were secured. After charging a nematic liquid crystal material into the gap, it was tightly sealed to obtain a liquid crystal display device according to the present invention.

As described above, the colored film could be formed directly on the substrate having the electronic circuit material and the colored film (color filter) could be formed by a simple and convenient step at low cost. The colored film thus obtained was of high resolution power and excellent in surface smoothness. Further, a colored film having a sufficient conductivity to drive the liquid crystal material disposed on the colored film could be obtained by incorporating a conductive material in the aqueous electrolyte.

Further, a driving device having a colored film of high resolution power and excellent in surface smoothness and a liquid crystal display device having a pixel pattern of high resolution power could be obtained at low cost without combining a TFT driving substrate and a color filter fabricated separately.

<Scratch Test>

The film surface of the colored film and the black matrix formed in Examples 1 to 3 was scratched while pressing by a pencil (2H) under a predetermined pressure, and the state of the surface such as the colored film was visually evaluated after scratching.

The film surface of the color filter after the test showed no flaws and had a sufficient film strength.

The present invention can provide a method of forming colored film capable of forming the colored film of high resolution power and excellent in surface smoothness including the fine pixel pattern directly on the substrate having the electronic circuit material by a simple and convenient step at low cost.

Further, the present invention can provide a driving device having the colored film of high resolution power and excellent in surface smoothness at low cost, as well as provide a liquid crystal display device having the fine pixel pattern of high resolution power at low cost without combining a TFT driving substrate and a color filter fabricated separately.

What is claimed is:

1. A method of forming a colored film comprising the steps of:
   forming a substrate for electrodeposition by laminating at least a transparent conductive film and a transparent thin photosemiconductor film having a photovoltaic function in this order on the surface of a support having a thin film transistor thereon; and
   irradiating with light at least a thin photosemiconductor film of the substrate for electrodeposition while bringing the same into contact with an aqueous electrolyte containing an electrodeposition material containing a colorant, thereby selectively generating a photoelectromotive force to an irradiated area of the thin photosemiconductor film and electrochemically depositing the electrodeposition material to form a colored film.

2. A method of forming a colored film according to claim 1, wherein the step of forming a substrate for electrodeposition is a step of forming a conductive film so as to be connected with the thin film transistor in a region on the surface of the substrate on the side disposed with the thin film transistor in which the thin film transistor is not disposed and laminating the thin photosemiconductor film at least on the conductive film.

3. A method of forming a colored film according to claim 1, wherein the step of forming a substrate for electrodeposition is a step of disposing a transparent insulative layer on the surface of the substrate and then laminating at least a conductive film and a thin photosemiconductor film in this order.

4. A method of forming a colored film according to claim 1, further comprising, after the step of forming a colored film, the step of:
   forming a transparent conductive layer on the surface of the substrate for electrodeposition on the side formed with the colored film, so as to form a current supply channel for the thin film transistor.

5. A method of forming a colored film according to claim 1, wherein the volume electric resistance value of the colored film is from $10^{-3}$ to $10^{12}$ Ω·cm.

6. A method of forming a colored film according to claim 1, wherein the thickness of the colored film is from 0.4 to 4.5 μm.

7. A method of forming a colored film according to claim 1, further comprising, after the step of forming a colored film, the step of:
   heat treating at a temperature from 80 to 250° C.

8. A method of forming a colored film according to claim 1, wherein the electrodeposition material contains a compound having carboxyl groups.

9. A method of forming a colored film according to claim 8, wherein the compound having the carboxyl groups is a polymer having hydrophobic domains and hydrophilic domains and the number of the hydrophobic domains is 30 to 75% of the total number of the hydrophobic domains and the hydrophilic domains.

10. A method of forming a colored film according to claim 9, wherein the hydrophobic domain in the polymer comprises a styrenic or styrene derivative.

11. A method of forming a colored film according to claim 9, wherein 50% or more for the number of hydrophilic domains in the polymer changes from a water-soluble state to a water-insoluble state or from a water-insoluble state to a water soluble state depending on the change of pH.

12. A method of forming a colored film according to claim 9, wherein the acid value of the polymer is from 60 to 200.

13. A method of forming a colored film according to claim 9, wherein the number average molecular weight of the polymer is from 6,000 to 25,000.

14. A method of forming a colored film according to claim 1, wherein an ion dissociation salt may not giving an effect on the electrodeposition characteristic is added to an aqueous electrolyte to make the volume resistivity of the aqueous electrolyte to $10^0$ to $10^5$ Ω·cm in the step of forming a colored film.

15. A method of forming a colored film according to claim 1, wherein pH of the aqueous electrolyte is within a range of ±1.5 relative to pH at which the electrodeposition material starts deposition and 8.5 or less.

16. An electronic driving device comprising, on a transparent substrate thereof:

a thin film transistor;

a transparent conductive film connected with the thin film transistor;

a transparent thin photosemiconductor film having a photovoltaic function and covering at least the conductive film; and a colored film disposed on the thin photosemiconductor film.

17. A liquid crystal display device comprising:

the electronic driving device according to claim 16;

a transparent conductive plate disposed facing the electronic driving device; and a liquid crystal disposed between the electronic driving device and the transparent conductive plate.

18. An electronic driving device comprising, on a transparent substrate thereof:

plural thin film transistors arranged orderly;

a first common electrode connecting gate electrodes constituting respective thin film transistors in common;

a second common electrode connecting source electrodes constituting respective thin film transistors in common;

a transparent conductive film connected with drain electrodes constituting respective thin film transistors;

a transparent thin photosemiconductor film having a photovoltaic function and covering at least the conductive film; and a colored film disposed on the thin photosemiconductor film.

* * * * *